United States Patent [19]
Sawada et al.

[11] Patent Number: 6,030,313
[45] Date of Patent: Feb. 29, 2000

[54] CONTROL SYSTEM FOR CONTINUOUSLY VARIABLE TRANSMISSION

[75] Inventors: Makoto Sawada; Hirofumi Okahara, both of Kanagawa, Japan

[73] Assignee: Nissan Motor Co., Ltd., Yokohama, Japan

[21] Appl. No.: 09/122,647

[22] Filed: Jul. 27, 1998

[30] Foreign Application Priority Data

Jul. 25, 1997 [JP] Japan ................................ 9-200454

[51] Int. Cl.$^7$ ................................................ F16H 11/06
[52] U.S. Cl. ................................................ 477/46
[58] Field of Search ................................ 477/46, 48, 41, 477/40

[56] References Cited

U.S. PATENT DOCUMENTS

| | | | |
|---|---|---|---|
| 4,682,519 | 7/1987 | Okada et al. | 477/46 |
| 4,734,082 | 3/1988 | Tezuka | 474/28 |
| 4,759,236 | 7/1988 | Tezuka et al. | 477/46 |
| 5,052,247 | 10/1991 | Kato et al. | 477/48 |
| 5,616,100 | 4/1997 | Sakai et al. | 477/46 |
| 5,697,866 | 12/1997 | Okahara | 477/169 |

FOREIGN PATENT DOCUMENTS

| | | |
|---|---|---|
| 2-125174 | 5/1990 | Japan . |
| 3-244863 | 10/1991 | Japan . |
| 8-200461 | 8/1996 | Japan . |
| 8-324415 | 12/1996 | Japan . |

*Primary Examiner*—Dirk Wright
*Attorney, Agent, or Firm*—Foley & Lardner

[57] ABSTRACT

A control system comprises a line pressure control section which controls a line pressure applied to pulleys of a CVT according to an input load from the engine. When the input load is temporally increased, the line pressure is temporally increased by a pressure increasing section. After the line pressure is held for a predetermined time, the temporally increased line pressure is slowly decompressed by a step amount which is set small according to the increase of a transmission ratio of the CVT. This slow decompression of the line pressure suppresses the generation of vibrations of a drive system. Further, when an anti-skid control apparatus is operating or when a start clutch is engaged by the increase of the line pressure, the slow decompression is cancelled to smoothly execute their operations.

16 Claims, 19 Drawing Sheets

LINE PRESSURE (OBJECTIVE)

FRICTION

ACCELERATION

LINE PRESSURE (OBJECTIVE)

CLUTCH PRESSURE

SPEED
(VEHICLE BODYSPEED,
WHEEL SPEED)

LINE PRESSURE
(OBJECTIVE)

CONTROL SYSTEM FOR CONTINUOUSLY VARIABLE TRANSMISSION

BACKGROUND OF THE INVENTION

The present invention relates to improvements in a control system for a continuously variable transmission (CVT) for a vehicle, and more particularly to a control system of a belt type CVT.

A Japanese Patent Provisional Publication No. 8-200461 discloses a typical belt type CVT which comprises driver and follower pulleys and a belt for intercoupling the pulleys. Each of the driver and follower pulleys has a variable groove at which the belt is held. A belt holding force for holding the belt by each pulley is varied basically according to a line pressure which is produced by pressurizing a fluid by means of a pump through a CVT pressure control valve. The line pressure is increased according to the increase of an input load applied from an engine to the CVT. The input load is basically calculated from a throttle opening and an engine revolution speed of an engine. Further, a clutch pressure for controlling a start clutch such as a forward clutch and a reverse brake disposed between the engine and the CVT is produced from a branch pressure of the line pressure and is controlled by means of a clutch pressure control valve to establish the engagement between the engine and the CVT.

SUMMARY OF THE INVENTION

Although the input load to the CVT mechanism is basically applied from the engine, the input load is temporally increased by various reasons. For example, when an acceleration pedal is quickly and largely depressed, when a braking force is applied to the driving wheel according to the depression of a brake pedal, or when an intentional downshift is executed by the operation of a selector lever, the input load is temporally increased. In order to prevent the slippage of the belt even when the temporal increase of the input torque is generated, the conventional CVT is arranged to temporally correct the line pressure to adapt to such situation. These input load temporally increased conditions are detected from vehicle conditions caused by the operation of a driver. Therefore, it is possible to correctly increase the line pressure according to the detected condition. In case that a start clutch pressure is obtained by controlling a branch pressure of the line pressure, the line pressure is increased in order to quickly increase the start clutch pressure to enable the engagement of the start clutch. That is, the line pressure is temporally increased when the select lever is set at a start shift position. After this temporal increase of the line pressure, the increased line pressure is held for a predetermined time and is steppingly and quickly decompressed to the normal line pressure.

However, when the increased line pressure is quickly decompressed, the magnitude of friction between the belt and the pulleys is quickly changed to generate vibrations of a drive system. The vibrations of the drive system are significantly generated when the transmission ratio of the CVT mechanism is large.

It is therefore an object of the present invention to provide an improved control system which is arranged to suppress vibrations of a drive system even after the line pressure is temporally increased.

A control system according to the present invention is for a continuously variable transmission (CVT) of a vehicle. The CVT comprises a driver pulley, a follower pulley and a belt intercoupling the pulleys, and varies a transmission ratio by changing effective diameters of the pulleys. The control system comprises a line pressure applying section, a vehicle condition detecting section, a temporal increase determining section, a pressure increasing section, and a slow decompressing section. The line pressure applying section applies a line pressure to the pulleys according to an input load from the engine. The vehicle condition detecting section detects a condition of the vehicle. The temporal increase determining section determines according to the detected vehicle condition that the input load is temporally increased. The pressure increasing section temporally increases the line pressure when the input load is temporally increased. The slow decompressing section slowly decompresses the temporally increased line pressure after the line pressure is increased by the pressure increasing section.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1A to 20B, there is shown an embodiment of a control system for a continuously variable transmission (CVT) in accordance with the present invention.

Figure 1A:
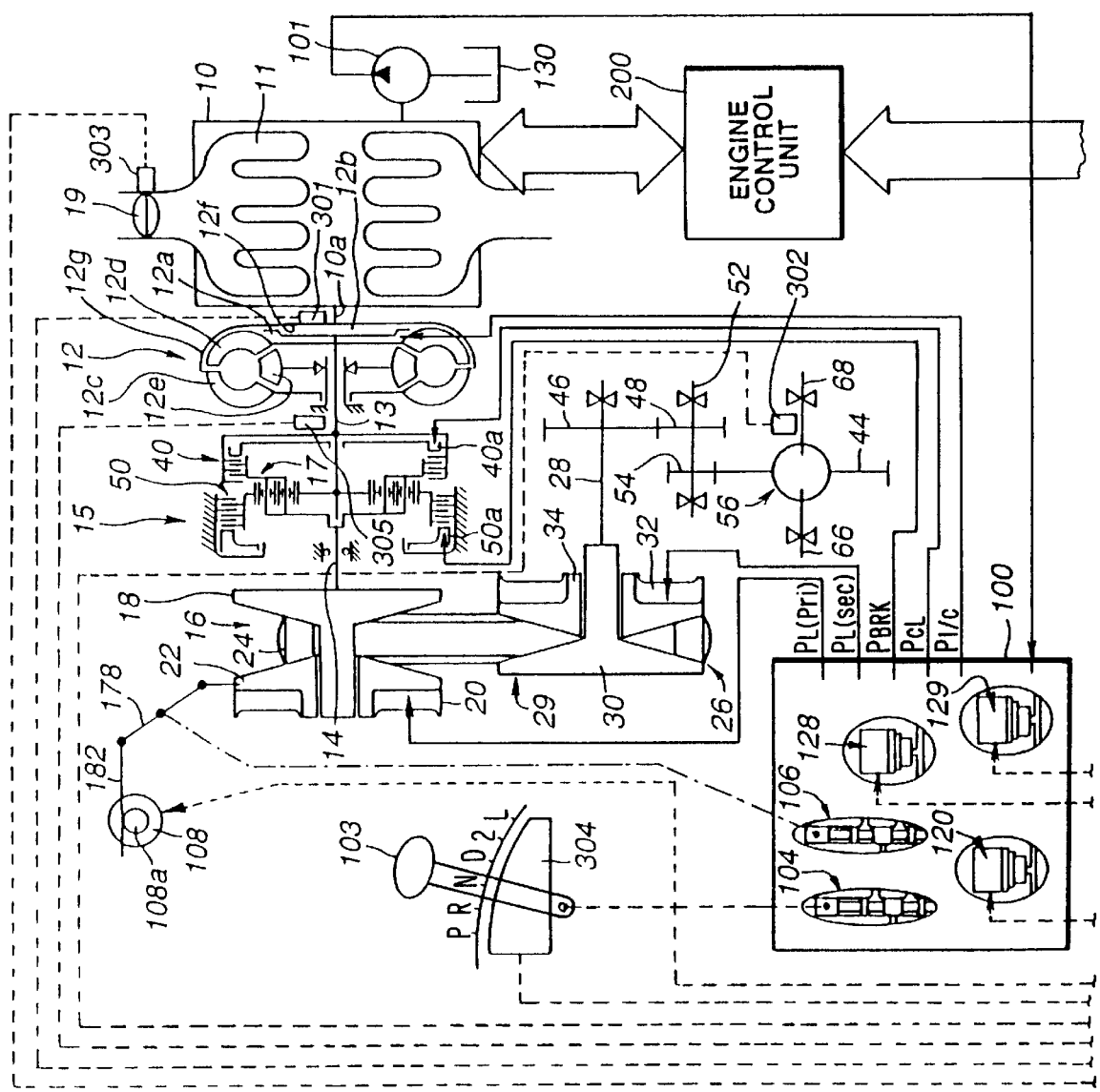
FIG. 1 is a schematic view showing a CVT and a control system thereof according to an embodiment of the present invention.
Figure 1B:
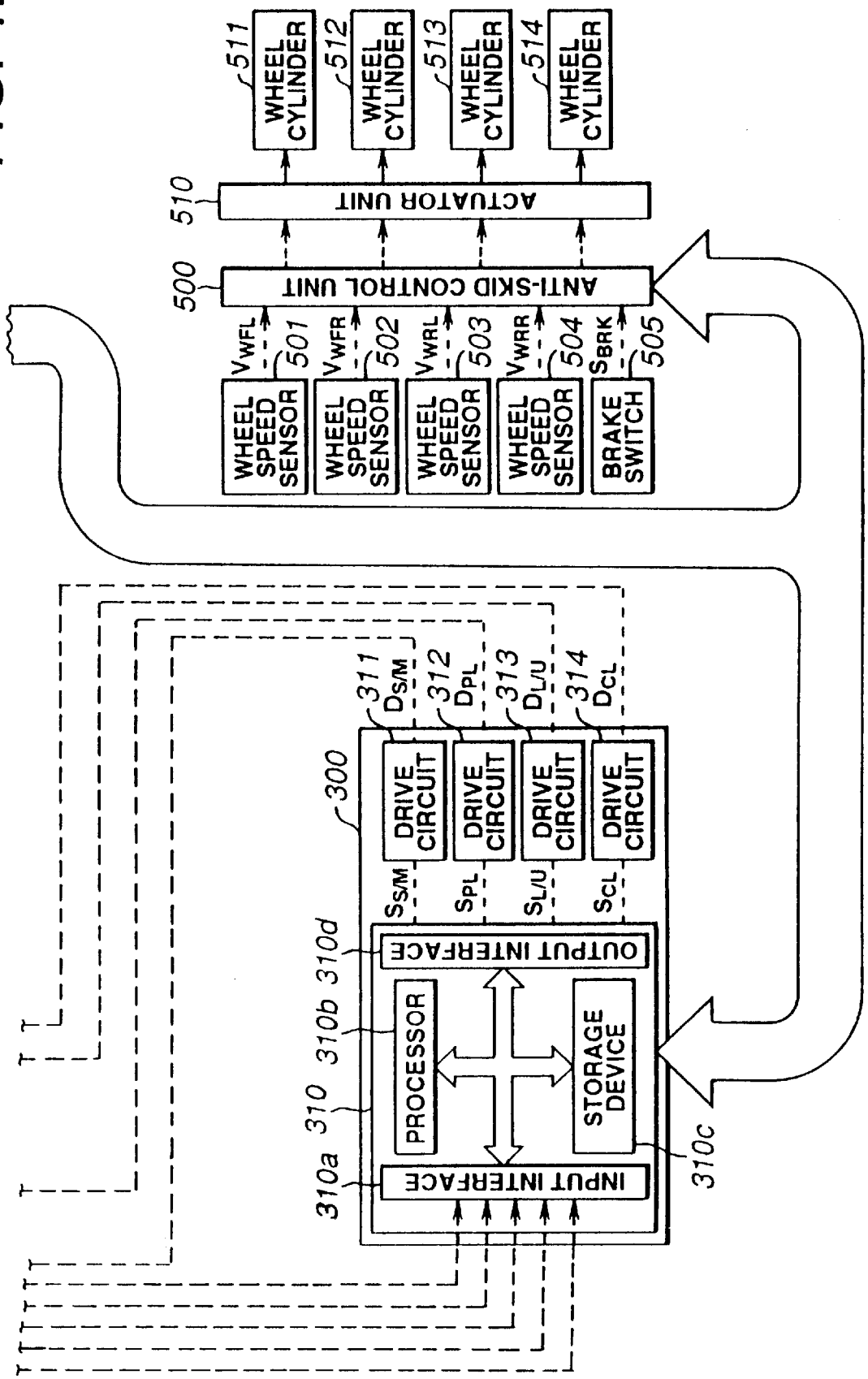

FIGS. 1A and 1B show an embodiment of the CVT and the control system thereof according to the present invention. A power transmission mechanism of the CVT is basically the same as that of a power transmission mechanism disclosed in a U.S. Pat. No. 5,697,866 except that a torque converter 12 is employed instead of a fluid coupling and except that an anti-skid control system is employed in the vehicle equipped with the CVT. Therefore, the same parts and elements of the power transmission mechanism are designated by same reference numerals, and only a brief explanation thereof will be given hereinafter.

As shown in FIG. 1A, an engine 10 is connected to a V-belt type CVT mechanism 29 through the torque converter 12 and a forward/reverse change over mechanism 15. An output shaft of the CVT mechanism 29 is connected to a differential unit 56. These elements 10, 12, 29 and 56 constitute a so-called drive system. The drive system transmits rotation of an output shaft 10a of the engine 10 to right and left drive shaft 66 and 68 at a selected speed ratio in a selected rotational direction to drive a vehicle.

A throttle valve 19 is disposed in an air intake passage 11 of the engine 10 and is arranged to change a degree of its opening in response to a depression degree of an accelerator pedal (no numeral). A throttle opening sensor 303 is installed to the throttle valve 19 to detect a throttle opening TVO of the throttle valve 19 and to output a signal indicative of the throttle opening TVO. An engine revolution speed sensor 301 is installed on the output shaft 10a of the engine 10 to detect an engine revolution speed $N_E$ and to output a signal indicative of the engine revolution speed $N_E$. The engine 10 is connected to an engine control unit 200 by which various engine operation factors such as fuel injection amount and timing and ignition timing are controlled so as to put the engine 10 in an optimum operating condition according to the running condition of the vehicle and a driver's intent.

The throttle opening indicative signal TVO outputted from the throttle opening sensor 303 also corresponds to the magnitude of the depression degree of the accelerator pedal. Although the engine revolution speed sensor 301 is arranged to detect the rotation speed of the output shaft 10a of the engine 10 in this embodiment, it will be understood that it may be arranged to count the number of ignition pulses of the engine 10 as an engine revolution speed.

The torque converter 12 of this drive system is a lockup torque converter of a known type. This lockup torque converter 12 comprises a pump impeller (input member) 12c, a turbine runner or turbine (output member) 12d, a stator 12e, and a lockup facing member (or lockup clutch) 12f for providing a direct mechanical drive by directly coupling the input and output members 12c and 12d. The lockup facing member 12f is connected with an output shaft (turbine shaft) 13. The lockup facing member 12d separates an apply side fluid chamber 12a and a release side fluid chamber 12b. The release chamber 12b is formed between a cover 12g of a torque converter 12 and the lockup facing member 12f, and the apply chamber 12a is disposed on the opposite side of the lockup facing member 12f. When a fluid pressure is supplied into the apply chamber 12a, the lockup facing member 12f is pressed against the cover 12g, and the torque converter 12 is put in a lockup state in which the input member 12c and the output member 12d are directly connected. When the fluid is supplied sufficiently into the release chamber 12b, the lockup facing member 12f is disengaged from the cover 12g, and the torque converter 12 is held in a non-lockup state (or unlockup state). The fluid pressure applied to the release chamber 12b is drained through the apply chamber 12a.

An input rotation speed sensor 305 is installed on an output shaft 13 (turbine output shaft) of the torque converter 12 as a drive system rotation condition change detecting means (estimated rotational change condition detecting means) in order to detect an input rotation speed of the CVT mechanism 29.

When the vehicle is put in a normal running condition, the forward clutch 40 is put in a full engagement state. Therefore, the rotation speed of the turbine output shaft 13 is used as an input rotation speed $N_{Pri}$ of the CVT mechanism 29. When a foot of a driver is released from the accelerator pedal, the forward/reverse change over mechanism 15 functions to control a creep running force by variably adjusting the engagement force of the forward clutch 40. The fluid supplied to the release chamber 12b is drained through the apply chamber 12a to a reservoir 130, and a drained fluid of the fluid supplied to the apply chamber 12c is supplied from the release chamber 12b to other cooling and lubricating systems. That is, the selecting control between the lockup state and the unlockup state is executed by changing a flow direction of the fluid supplied to the lockup mechanism of the torque converter 12 as mentioned above without changing the fluid passage.

The forward/reverse drive direction change over mechanism 15 comprises a planetary gear system 17, the forward clutch 40 and a reverse brake 50. The planetary gear system 17 comprises multistage pinion trains and a pinion carrier supporting these pinion trains. The pinion carrier is connected to the driver pulley 16 of the CVT mechanism 29 through the driver pulley shaft 14, and a sun gear is connected to the turbine rotation shaft 13. The pinion carrier is engageable with the turbine rotation shaft 13 by means of the forward clutch 40. A ring gear of the planetary gear system 17 is engageable with a stationary housing.

The reverse brake 50 is disposed between a ring gear of the planetary gear system 17 and a stationary housing to hold the ring gear. When the forward clutch 40 is put in the engaged state by the supply of the fluid pressure to a fluid chamber 40a, the driver pulley shaft 14 and the turbine output shaft 13 are rotated in the same direction with equal speed through a pinion carrier. When the reverse brake 50 is engaged by the supply of the fluid pressure to the fluid chamber 50a, the driver pulley shaft 14 and the turbine output shaft 13 are rotated with equal speed but in the opposite direction.

The V-belt CVT mechanism 29 comprises a driver pulley 16, a follower (or driven) pulley 26, and a V-belt 24 for transmitting power between the pulleys. The driver pulley 16 is mounted on the driver pulley shaft 14. The driver pulley 16 comprises an axially stationary fixed conical disk 18, and an axially movable conical disk 22, which confront each other and define a V-shaped pulley groove therebetween for receiving the V-belt 24. The fixed disk 18 rotates as a unit with the driver shaft 14. By a fluid pressure in a driver pulley cylinder chamber 20, the movable disk 22 is axially movable.

The follower pulley 26 is mounted on a follower pulley shaft 28. The follower pulley 26 comprises an axially stationary fixed conical disk 30, a follower pulley cylinder chamber 32, and an axially movable conical disk 34. The fixed and movable disks 30 and 34 confront each other and define a V-shaped pulley groove for receiving the V belt 24. The fixed disk 30 rotates as a unit with the follower shaft 28. The movable disk 34 is axially movable in dependence on a fluid pressure in the follower pulley cylinder chamber 32.

The V-belt CVT mechanism 29 further comprises a stepping motor 108 controlled by a transmission control unit 300, as shown in FIG. 1B. A pinion 108a is connected to a rotation shaft of the stepping motor 108 and is meshed with a rack 182. An end of the rack 182 and the movable conical disk 22 are interconnected through a lever 178. By the operation of the stepping motor 108 according to the drive signal $D_{S/M}$ from the transmission control unit 300, the movable conical disk 22 of the driver pulley 16 and the movable conical disk 34 of the follower pulley 26 are axially moved to vary the effective radius of the contact position of each pulley of the driver and follower pulleys 16 and 26 axially. By so doing, the CVT mechanism 29 can vary the speed ratio (transmission ratio or pulley ratio) between the driver pulley 16 and the follower pulley 26.

The shift control system (pulley ratio varying control) is generally arranged to vary the pulley groove width of one of the driver and follower pulleys and allow the groove width of the other to be adjusted automatically. The arrangement is achieved by the belt of a push type which transmits the driving force mainly in the pushing direction. The push type V-belt 24 comprises a set of plates which are overlappingly arranged in the longitudinal direction or wound direction of the belt.

A drive gear 46 fixed to the follower pulley shaft 28 is meshed with an idler gear 48 formed on an idler shaft 52. A pinion gear 54 formed on the idler shaft 52 is meshed with a final gear 44 with which right and left drive shafts 66 and 68 are interconnected through the differential unit 56. A vehicle speed sensor 302 is installed on this final output shaft to detect a vehicle speed $V_{SP}$ and output a signal indicative of the vehicle speed $V_{SP}$ to the transmission control unit 300.

Next, a construction of a hydraulic pressure control apparatus of the CVT will be discussed. The hydraulic pressure control apparatus comprises a pump 101 driven by the engine 10. The pump 101 draws a working fluid from a reservoir 130 and supplies the fluid to an actuator unit 100 while applying a sufficient pressure to the fluid. The construction of the actuator unit 100 is basically the same as that of the actuator unit disclosed in a U.S. Pat. No. 5,697,866. Therefore, the same parts and elements are designated by same reference numerals, and only a brief explanation thereof will be given hereinafter.

A manual valve 104 is directly operated by a selector lever 103 so as to switchingly control a clutch pressure $P_{CL}$ to a cylinder chamber 40a of the forward clutch 40 and a brake pressure $P_{BRK}$ to a cylinder chamber 50a of the reverse brake 50.

An inhibitor switch 304 installed on the selector lever 103 detects a shift position selected by the selector lever 103 and outputs a shift range signal $S_{RANGE}$ indicative of the selected shift position. More particularly, the shift range signal $S_{RANGE}$ includes signals corresponding to P, R, N, D, 2, and L according to the actually selected shift position.

A shift control valve 106 is controlled according to a relative displacement between the stepping motor 108 and the movable conical disk 22 of the driver pulley 16, more particularly it is controlled according to the movement of the lever 178. That is, the shift control valve 106 controls the fluid pressure (line pressure) $P_{L(Pri)}$ supplied to the driver pulley 16 according to a relative relationship between the required transmission ratio and a groove width of the driver pulley 16.

A lockup control duty valve 128 controls a lockup mechanism of the torque converter 12 so as to put the torque converter 12 in one of a lockup state and an unlockup state. A transmission control unit 300 outputs a drive signal $D_{L/U}$ to the lockup control valve 128 to operate the lockup mechanism of the torque converter 12. More particularly, when the drive signal $D_{L/U}$, indicative of a large duty ratio, is outputted to the lockup control duty valve 128, the torque converter 12 is put in the lockup state. When the drive signal $D_{L/U}$, indicative of a small duty ratio, is outputted to the lockup control valve 128, the torque converter 12 is put in the unlockup (non-lockup) state.

A clutch engagement duty valve 129 controls an engagement force for one of the forward clutch 40 and the reverse brake 50 according to a drive signal $D_{CL}$ from the transmission control unit 300. When the drive signal $D_{CL}$ indicates a large duty ratio, one of the forward clutch 40 and the reverse brake 50 is engaged. When the drive signal $D_{CL}$ indicates a small duty ratio, it is disengaged.

A line pressure control duty valve 120 controls the line pressure $P_L$ supplied mainly to the follower pulley 26 and partly to the driver pulley 16 so as to hold the belt 24 by the pulleys 26, 16 according to a drive signal $D_{PL}$ from the transmission control unit 300. This duty valve 120 is represented as a modifier duty valve in the above cited Patent document. The reason for this is the output pressure from the duty valve 120 once functions as a pilot pressure of a pilot pressure control valve named as a pressure modifier valve. As a result, an output pressure from the pressure modifier valve functions as a pilot pressure of the line pressure control valve so as to control the line pressure $P_L$ produced in an upstream side of the line pressure control valve. That is, by controlling the duty ratio of the duty valve 120, the line pressure $P_L$ is indirectly controlled.

Figure 2:
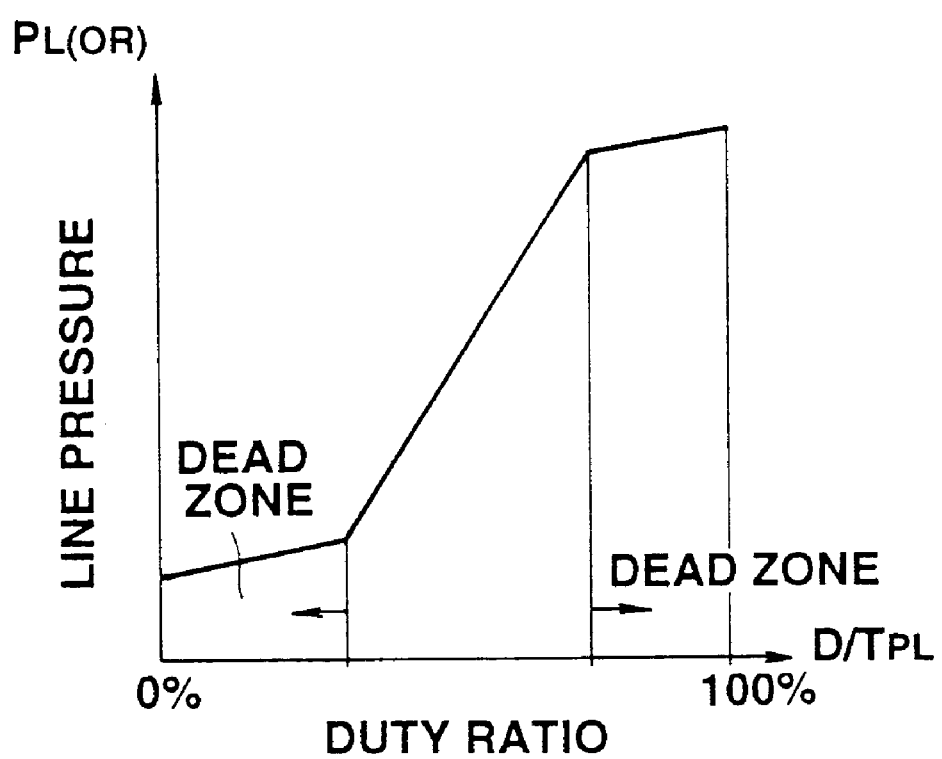
FIG. 2 is a graph showing a control map for setting a duty ratio of a duty valve for controlling a line pressure according to an objective line pressure.

In this embodiment, the objective line pressure $P_{L(OR)}$ is linearly increased according to the increase of the control signal to the line pressure control duty valve 120 or duty ratio $D/T_{PL}$ of the drive signal except for dead zone as shown in FIG. 2. More particularly, when the output pressure of the pressure modifier valve is increased, the base (original) pressure of the clutch pressure and the base pressure of the lockup pressure of the torque converter 12 are simultaneously increased although the gradients and intercepts thereof are different respectively from others.

The transmission control unit 300 comprises a microcomputer 310 functioning as a control means, and four drive circuits 311 to 314. The microcomputer 310 outputs control signals for controlling the CVT mechanism 29 and the actuator unit 100 by executing a process shown by a flowchart of FIG. 3. The first to fourth drive circuits 311 to 314, respectively, convert the control signals outputted from the microcomputer 310 into drive signals for practically controlling the actuators such as the stepping motor 108 and the respective duty valves 120, 128 and 129.

The microcomputer 310 comprises an input interface circuit 310a including an A/D converter, a calculation processor 310b such as a microprocessor, a storage device 310c such as ROM and RAM, and an output interface circuit 310d including a D/A converter.

The microcomputer 310 executes various operations such as obtained a rotation angle of the stepping motor 108 for setting the actual transmission ratio, outputting a pulse signal $S_{S/H}$ for achieving the rotation angle, obtaining the optimum line pressure for holding the belt 24, calculating the duty ratio $D/T_{FL}$ of the line pressure control duty valve 120 for achieving the necessary line pressure $P_L$, obtaining the fluid pressure (torque converter pressure) $P_{T/C}$ for controlling the lockup mechanism of the torque converter 12, calculating the duty ratio $D/T_{L/U}$ of the lockup control duty valve 128 for achieving the torque converter pressure $P_{T/C}$, outputting a lockup control signal $S_{L/U}$ according to the lockup control duty ratio $D/T_{L/U}$, obtaining the fluid pressure (clutch pressure) $P_{CL}$ which is optimum to execute a creep running of the vehicle under when the accelerator pedal is put in the off condition (a foot of an operator is released from the accelerator pedal), calculating a duty ratio $D/T_{CL}$ of the clutch engagement control duty valve 129 necessary for achieving the required clutch pressure $P_{CL}$, outputting a clutch engagement control signal $S_{CL}$ according to the clutch pressure control duty ratio $D/T_{CL}$, and so on.

The first drive circuit 311 converts the pulse control signal $S_{S/H}$ into a drive signal $D_{S/H}$ and outputs it to the stepping motor 108. The second drive circuit 312 converts the pulse control signal $S_{PL}$ into a drive signal $D_{PL}$ and outputs it to the line pressure control duty valve 120. The third drive circuit 313 converts the pulse control signal $S_{L/U}$ into a drive signal $D_{L/U}$ and outputs it to the lockup control duty valve 128. The forth drive circuit 314 converts the pulse control signal $S_{CL}$ into a drive signal $D_{CL}$ and outputs it to the clutch engagement control duty valve 129. If the control signals according to the duty ratio and the pulse control signals satisfactorily indicate the desired duty ratios and number of pulses, the drive circuits 311 to 314 simply execute the amplifications thereof.

The engine control unit 200 also comprises a microcomputer which is interconnected with the microcomputer 310 of the transmission control unit 300 such that the engine 10 and the CVT are controlled according to the vehicle running condition.

On the other hand, the anti-skid control apparatus connected with the engine control unit and the transmission control unit 300 will be briefly discussed with reference to FIG. 1B.

The anti-skid control unit comprises an anti-skid control unit 500, first to fourth wheel speed sensors 501 to 504, a brake switch 505, an actuator unit 510 and first to fourth wheel cylinders 511 to 514. The first to fourth wheel speed sensors 501 to 504, respectively, detect wheel speeds $V_{WFL}$, $V_{WPR}$, $V_{WRL}$ and $V_{WRR}$ of four wheels of the vehicle and output wheel speed indicative signals to the anti-skid control unit 500. The brake switch 505 detects that the brake pedal is depressed in a predetermined degree and outputs a detection signal indicative of the depression of the brake pedal to the anti-skid control unit 500. The anti-skid control unit 500 comprises a microcomputer and outputs control signals to the actuator unit 510 to control the hydraulic pressures of the wheel cylinders 511 to 514 by executing various calculations such as calculating processes shown in Japanese Patent Provisional Publication No. 8-324415. The actuator unit 510 comprises a plurality of electromagnetic valves for compressing and decompressing fluid pressures in the wheel cylinders 511 to 514 according to the control signals from the anti-skid control unit 510.

For example, when the wheel speed of the wheel to be braked is largely different from an estimated vehicle speed, it may be assumed that the braked wheel tends to be put in a lockup state. The pressure in the wheel cylinder of the braked wheel is decreased to increase the wheel speed by means of a reaction force from a road surface. Thereafter, when the wheel speed is increased to a predetermined level with respect to the vehicle speed, the pressure of the wheel cylinder of the braked wheel is slightly and steppingly increased. That is, the braking force is increased by the slow compression to ensure the vehicle deceleration speed and the brake distance. If the braking force becomes too large due to this slow compression, the decompression is again executed. That is, by repeating the decompression and the slow compression, both of the steering characteristics and the braking distance are kept good.

The microcomputer of the anti-skid control unit 500 is interconnected with the microcomputer 310 of the transmission control unit 300, such that the transmission control unit 300 recognizes the controls and the detection signals of the anti-skid control unit 500.

Figure 3:
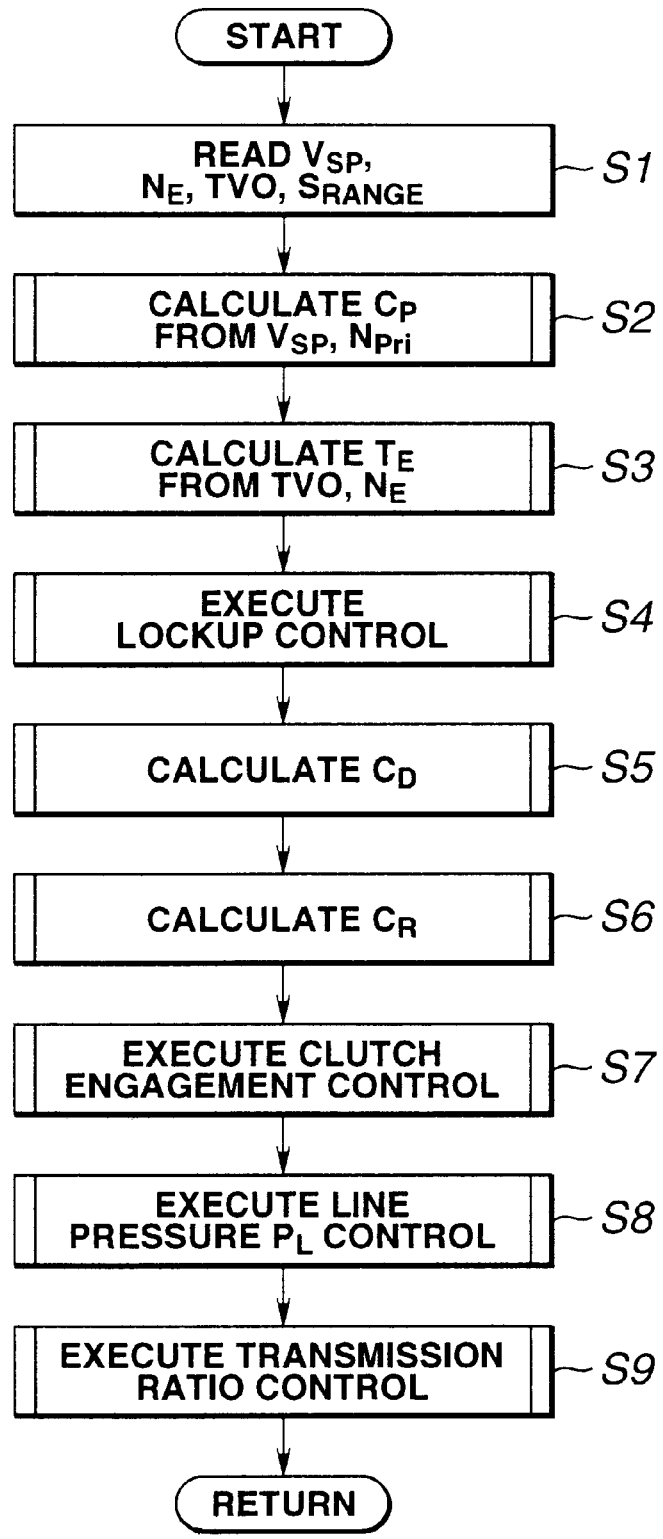
FIG. 3 is a flowchart showing a program executed by the transmission control unit of FIG. 1.
Figure 4:
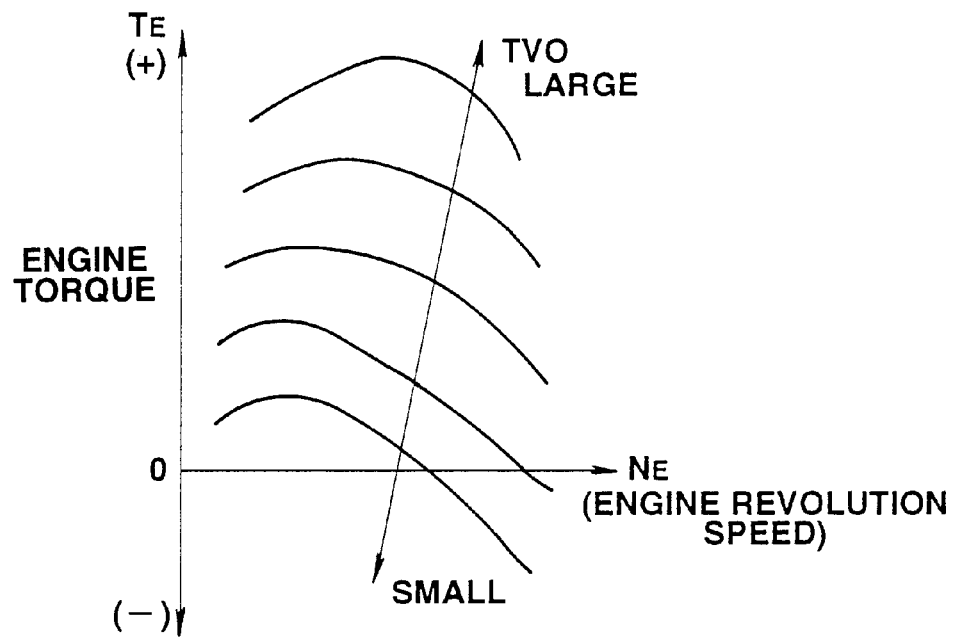
FIG. 4 is a graph showing a control map for setting an engine torque from a throttle opening and an engine revolution speed.
Figure 5:
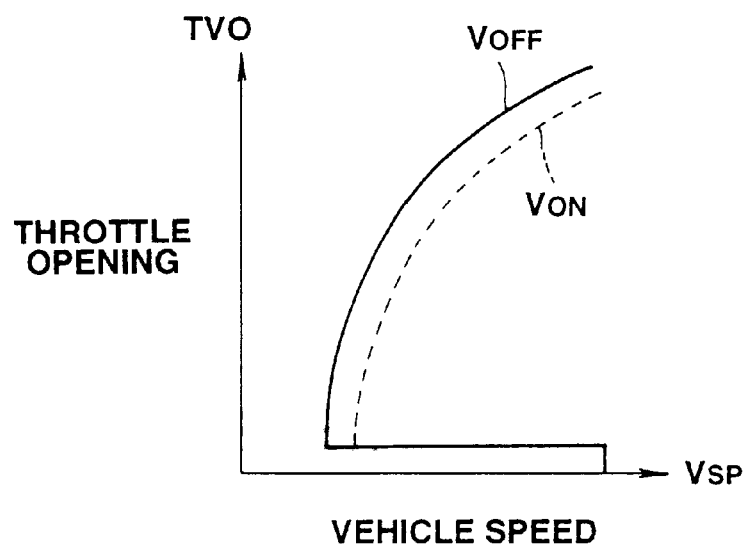
FIG. 5 is a graph showing a control map for setting a lockup vehicle speed and an unlockup vehicle speed from the vehicle speed and the throttle opening.

The transmission control of the present embodiment will be discussed with reference to a calculating process shown by a flowchart of FIG. 3 which is executed by the microcomputer 310. This calculating process is basically executed when the D-range is selected and when the engine control unit 200 requires no process to the transmission control unit 300.

Herein, a general flow of the shift control will be discussed. This calculating process is implemented as a timer interruption process at predetermined sampling time $\Delta T$ such as 10 milliseconds (msec). Although the flowchart of FIG. 3 does not show a step for a communication with others, the transmission control unit 300 timely executes a process for reading programs, maps and data used in the processor 310b from the storage device 310c and properly updates data calculated at the processor 310b and stores it in the storage device 310c.

At a step S1, the microcomputer 310 reads the signals indicative of the vehicle speed $V_{SP}$ outputted from the vehicle speed sensor 302, the engine revolution speed $N_E$ outputted from the engine revolution sensor 301, the input rotation speed $N_{Pri}$ outputted from the input rotation speed sensor 305, a throttle opening TVO outputted from the throttle opening sensor 303 and a shift range signal $S_{RANGE}$ from the inhibitor switch 304.

At a step S2, the microcomputer 310 calculates a present transmission ratio $C_F$ according to the vehicle speed $V_{SP}$ and the input rotation speed $N_{Pri}$ by executing an independently provided process (sub routine). More particularly, the output rotation speed $N_{Sec}$ of the CVT mechanism 29 is obtained by dividing the vehicle speed $V_{SP}$ in proportion with the final output shaft rotation speed by a final reduction speed ratio n ($N_{Sec}=V_{SP}/n$), and the present transmission ratio $C_P$ is obtained by dividing the input rotation speed $N_{Pri}$ by the obtained output rotation speed $N_{Sec}$ ($C_P=N_{Pri}/N_{Sec}$).

At a step S3, the microcomputer 310 calculates the engine torque $T_E$ on the basis of the throttle opening TVO and the engine revolution speed $N_E$ by executing an independently provided process (sub routine) such as a retrieval of a control map. More particularly, the present engine torque $T_E$ is obtained from the output characteristic map shown in FIG. 4 according to the throttle opening TVO and the engine revolution speed $N_E$.

At a step S4, the microcomputer 310 executes a lockup control by jumping the routine to an independently provided process (subroutine). More particularly, a lockup speed $V_{ON}$ and an unlockup speed $V_{OFF}$ are determined by using a control map shown in FIG. 5 according to the vehicle speed $V_{SP}$ and the throttle opening TVO. Basically, when the vehicle speed $V_{SP}$ is greater than the lockup speed $V_{ON}$, the microcomputer 310 generates and outputs the control signal $S_{L/U}$ including a lockup command for putting the torque converter 12 into the lockup state. When smaller than the unlockup speed $V_{OFF}$, the microcomputer 310 generates and outputs the control signal $S_{L/U}$ including an unlockup command for putting the torque converter 12 into the unlockup state. In particular, in case that the condition of the torque converter 12 is changed from the unlockup state to the lockup state, when a difference between the engine rotation speed $N_E$ and the input rotation speed $N_{Pri}$ is greater than a predetermined value, that is, when a difference between the engine revolution speed $N_E$ and the rotation speed of the turbine of the torque converter 12 is greater than the predetermined value, a gain employed for increasing the duty ratio $D/T_{L/U}$ is increased according to the magnitude of the difference. When the difference is smaller than a predetermined value, that is, when the torque converter 12 tends to be put in the lockup state, the gain for increasing the duty ratio $D/T_{L/U}$ is decreased so as to buffer shift shocks caused by the transition to the full lockup state.

Figure 6:
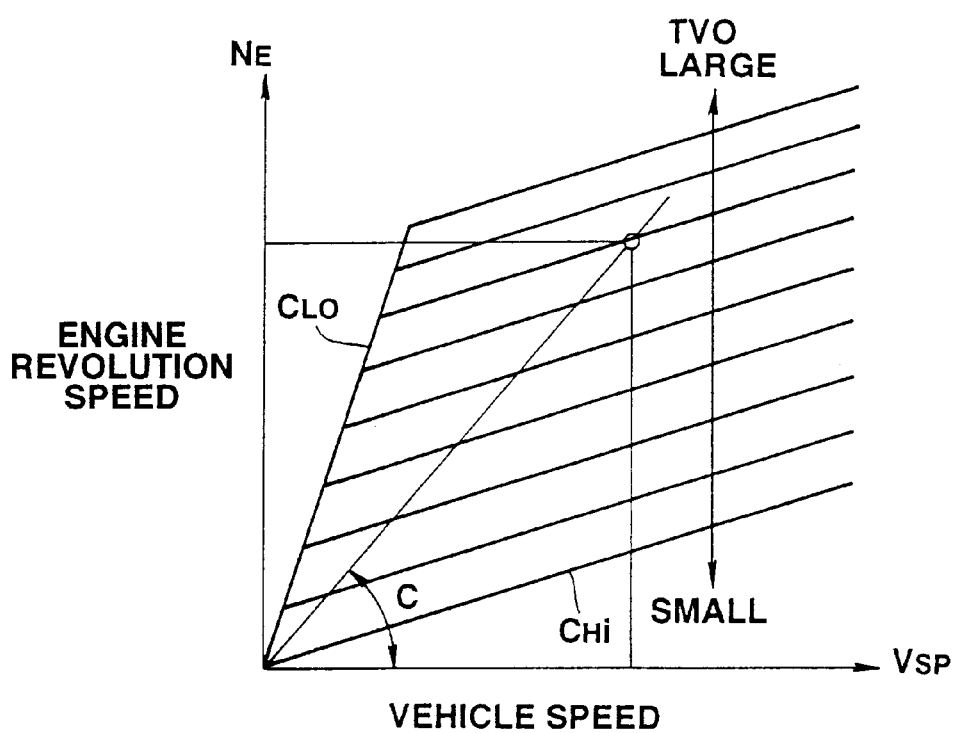
FIG. 6 is a graph showing a control map for setting a transmission ratio from the throttle opening and the vehicle speed.

At a step S5, the microcomputer 310 calculates a goal transmission ratio $C_D$ by executing an independently provided process (subroutine) such as the retrieval of a control map. The goal transmission ratio $C_D$ is the most ideal transmission ratio for achieving the present engine revolution speed $N_E$ from the vehicle speed and the throttle opening TVO. More particularly, as shown in FIG. 6, if a transmission ratio C, by which the vehicle speed $V_{SP}$, the throttle opening TVO and the engine revolution speed $N_E$ are completely matched, is set, it is possible to ensure an acceleration according to the depression degree of the accelerator pedal (the throttle opening TVO) while satisfying the vehicle speed $V_{SP}$ and the engine revolution speed $N_E$. Herein, if it is assumed that the map shown in FIG. 6 is the control map for setting the goal transmission ratio $C_D$, a straight line crossing with an origin point and having a constant gradient is a constant transmission ratio. For example, a straight line having the largest gradient in the whole area of the shift pattern is the largest speed reduction ratio of the vehicle, that is, a maximum transmission ratio $C_{LO}$. In reverse, a straight line having the smallest gradient in the whole area of the shift pattern is the smallest speed reduction ratio of the vehicle, that is, a minimum transmission ratio $C_{OH1}$. Herein, if the 2-range is selected through the select lever 103, the shift control is implemented within an area from the maximum transmission ratio $C_{LO}$ to a 2-range minimum transmission ratio $C_{2H1}$.

At a step S6, the microcomputer 310 calculates the objective transmission ratio $C_R$ according to an individually prepared process (subroutine). More particularly, when the goal transmission ratio $C_D$ is greater than the present transmission ratio $C_P$, the objective transmission ratio $C_R$ is set to execute the downshift. When smaller than the present transmission ratio $C_P$, the objective transmission ratio $C_R$ is set to execute the upshift. For example, the objective transmission ratio $C_R$ is set at a transmission ratio obtained at a moment elapsing a predetermined sampling time $\Delta T$ from when the shifting is executed from the present transmission ratio $C_P$ by the highest shift speed $dC_R/dt$ or smallest time constant $\tau$. Herein, if the throttle opening TVO is decreased from a nearly full open state, that is, when the depression degree of the accelerator pedal is decreased, the shift speed $dC_R/dt$ is little decreased or the time constant $\tau$ is little increased. Further, when the throttle opening TVO is further quickly decreased, such that the depression of the accelerator pedal is cancelled, the shift speed $dC_R/dt$ is further decreased or the time constant $\tau$ is further increased. That is to say, the objective transmission ratio $C_R$ is changed according to the closing change amount of the throttle valve 19.

In this embodiment, the time constant $\tau$ is employed in order to set the objective transmission ratio $C_R$, that is, to control the shift speed. Therefore, when the goal transmission ratio $C_D$ is set, the objective transmission ratio $C_R$ is determined as a curve which takes values gradually converging to the goal transmission ratio $C_D$.

At a step S7, the microcomputer 310 executes a clutch engagement control according to an individually provided process (subroutine). More particularly, as a basic manner, when the vehicle speed $V_{SP}$ is greater than a creep control threshold, the forward clutch 40 is engaged. When the vehicle speed $V_{SP}$ is smaller than the creep control threshold and when the throttle opening TVO is greater than a creep control full close threshold, the engagement of the forward clutch 40 is released. Such operations are executed by generating and outputting the corresponding signal $S_{CL}$ from the microcomputer 310 to the fourth drive circuit 314. When the vehicle speed $V_{SP}$ is smaller that the creep control threshold and when the throttle opening TVO is smaller than the full close threshold, the gain for changing the duty ratio $D/T_{CL}$ is changed in inverse proportion to the difference between the engine revolution speed $N_E$ and the input rotation speed $N_{Pri}$ (turbine output shaft rotation speed). By this arrangement, the engagement force of the clutch 40 is decreased if the vehicle tends to generate a creep running due to a road condition such as an up-slope road running condition, and the engagement force of the clutch 40 is increased if the vehicle does not tend to generate a creep running.

Figure 7:
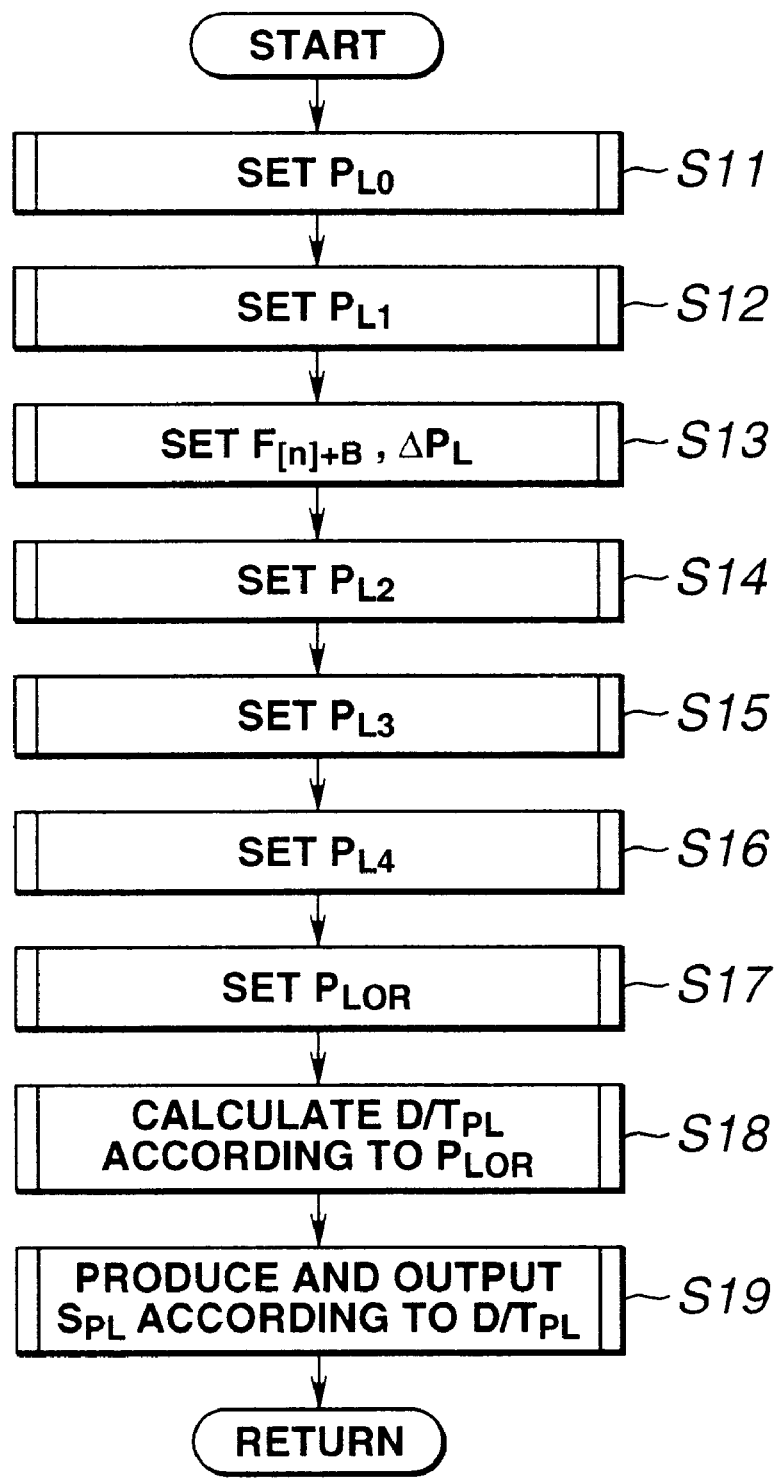
FIG. 7 is a flowchart showing a minor program of a calculation process step of FIG. 3.

At a step S8, the microcomputer 310 executes the control of the line pressure $P_L$ according to the process shown by a flowchart of FIG. 7. The detailed explanation of this line pressure control will be given later with reference to the flowchart of FIG. 7.

At a step S9, the microcomputer 310 executes a transmission ratio control according to an individually prepared process (subroutine). More particularly, with respect to the objective transmission ratio $C_R$, the total number of the pulses and the number of pulses per a unit time are determined. Then, the microcomputer 310 generates and outputs the pulse control signal $S_{S/M}$ satisfying the both numbers. After the execution of the step S9, the routine of this program returns to the main program.

Next, a calculating process for the line pressure control executed at the step S8 of the flowchart of FIG. 3 will be discussed in detail with reference to a flowchart of FIG. 7.

Figure 8:
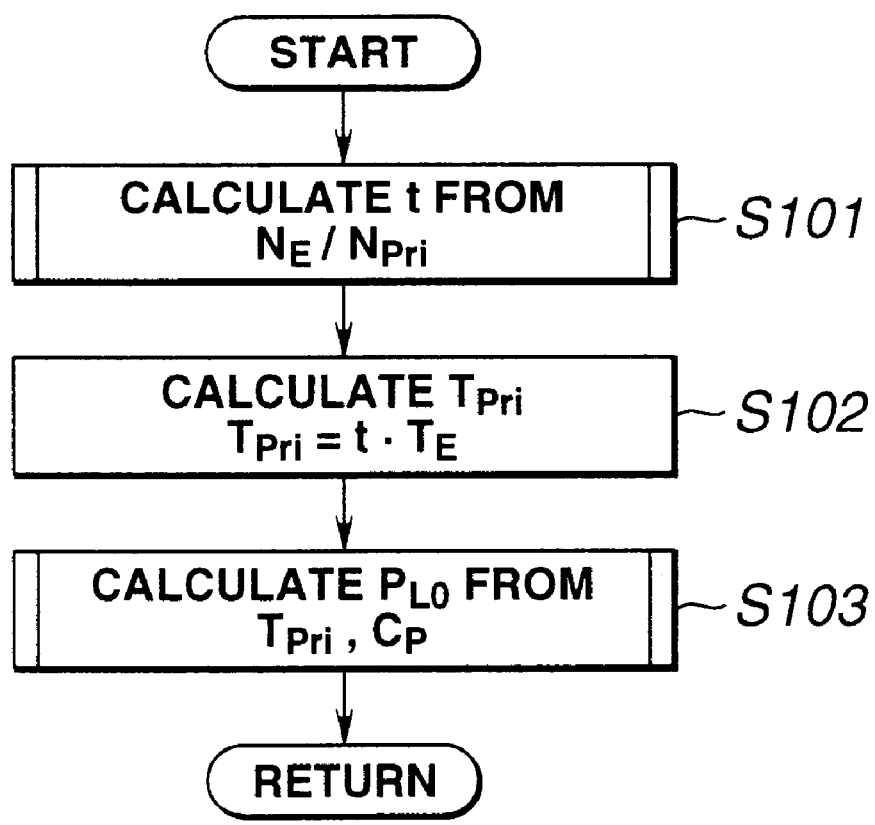
FIG. 8 is a flowchart showing a minor program of a calculation process step S11 of FIG. 7.

At a step S11, the microcomputer 310 sets a reference line pressure $P_{L0}$ by executing a process shown in FIG. 8.

Figure 9:
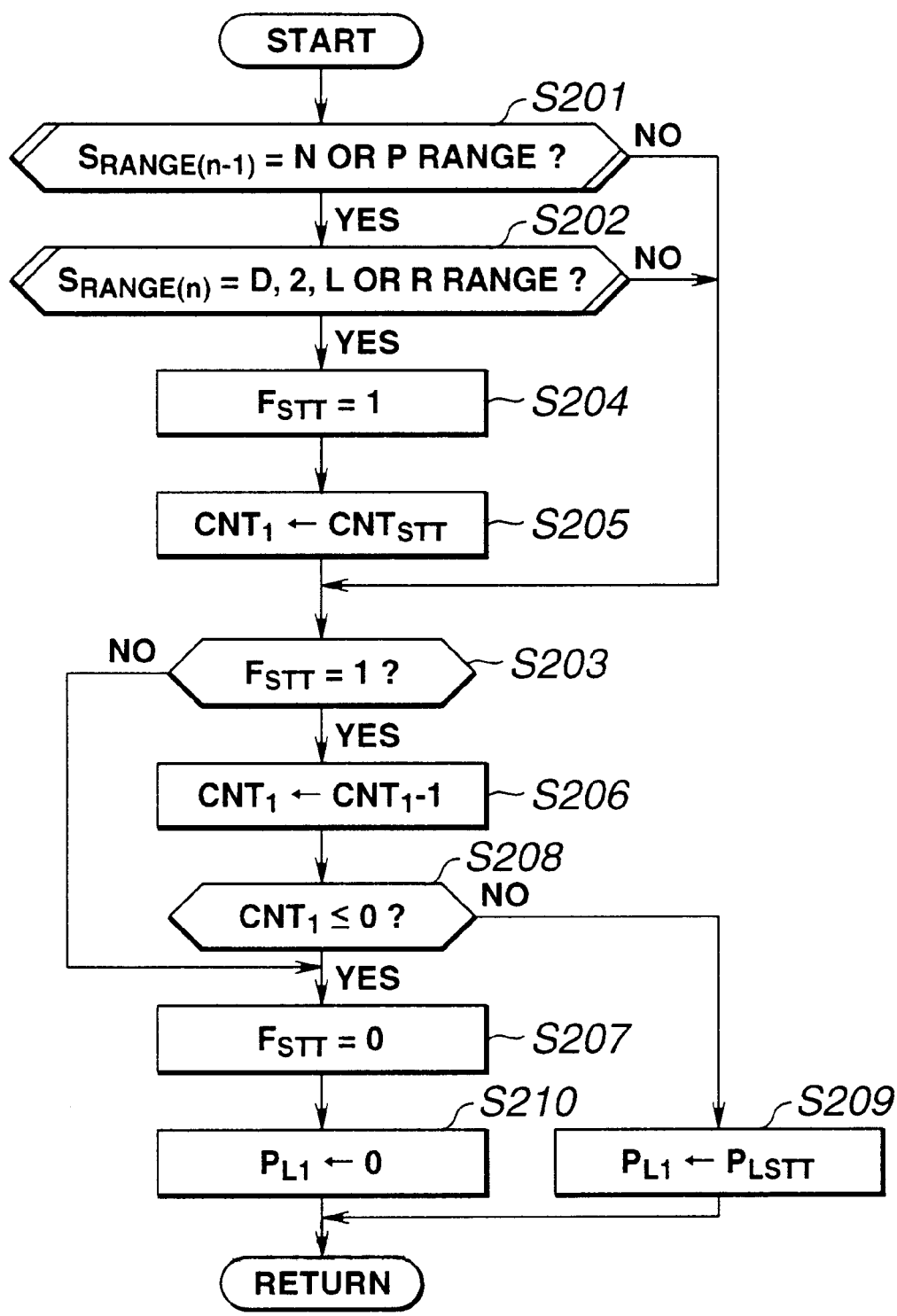
FIG. 9 is a flowchart showing a minor program of a calculation process step S12 of FIG. 7.

At a step S12, the microcomputer 310 sets a start line pressure $P_{L1}$ by executing a process shown in FIG. 9.

Figure 10:
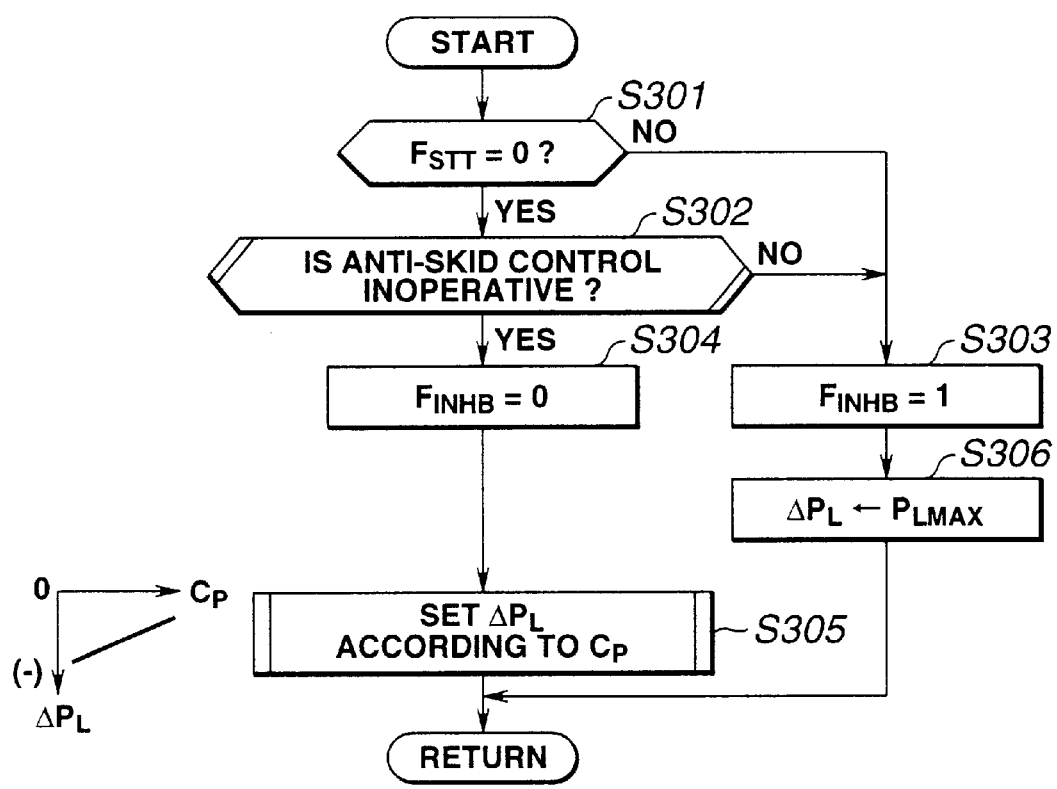
FIG. 10 is a flowchart showing a minor program of a calculation process step S13 of FIG. 7.

At a step S13, the microcomputer 310 sets a slow decompression inhibiting flag $F_{INHS}$ and a slow decompression step amount $\Delta P_L$ by executing a process shown in FIG. 10.

Figure 11:
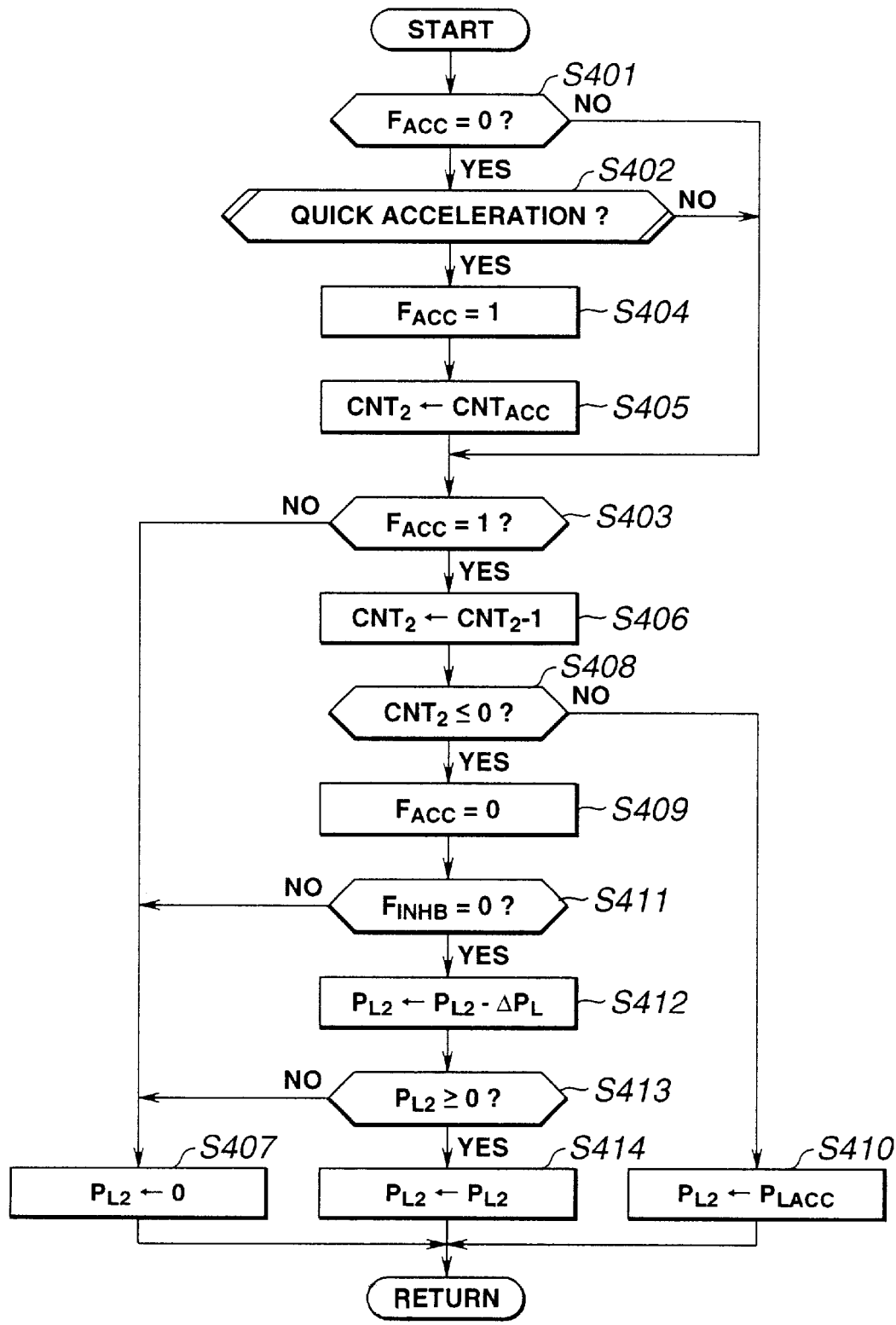
FIG. 11 is a flowchart showing a minor program of a calculation process step S14 of FIG. 7.

At a step S14, the microcomputer 310 sets a quick acceleration line pressure $P_{L2}$ by executing a process shown in FIG. 11.

Figure 12:
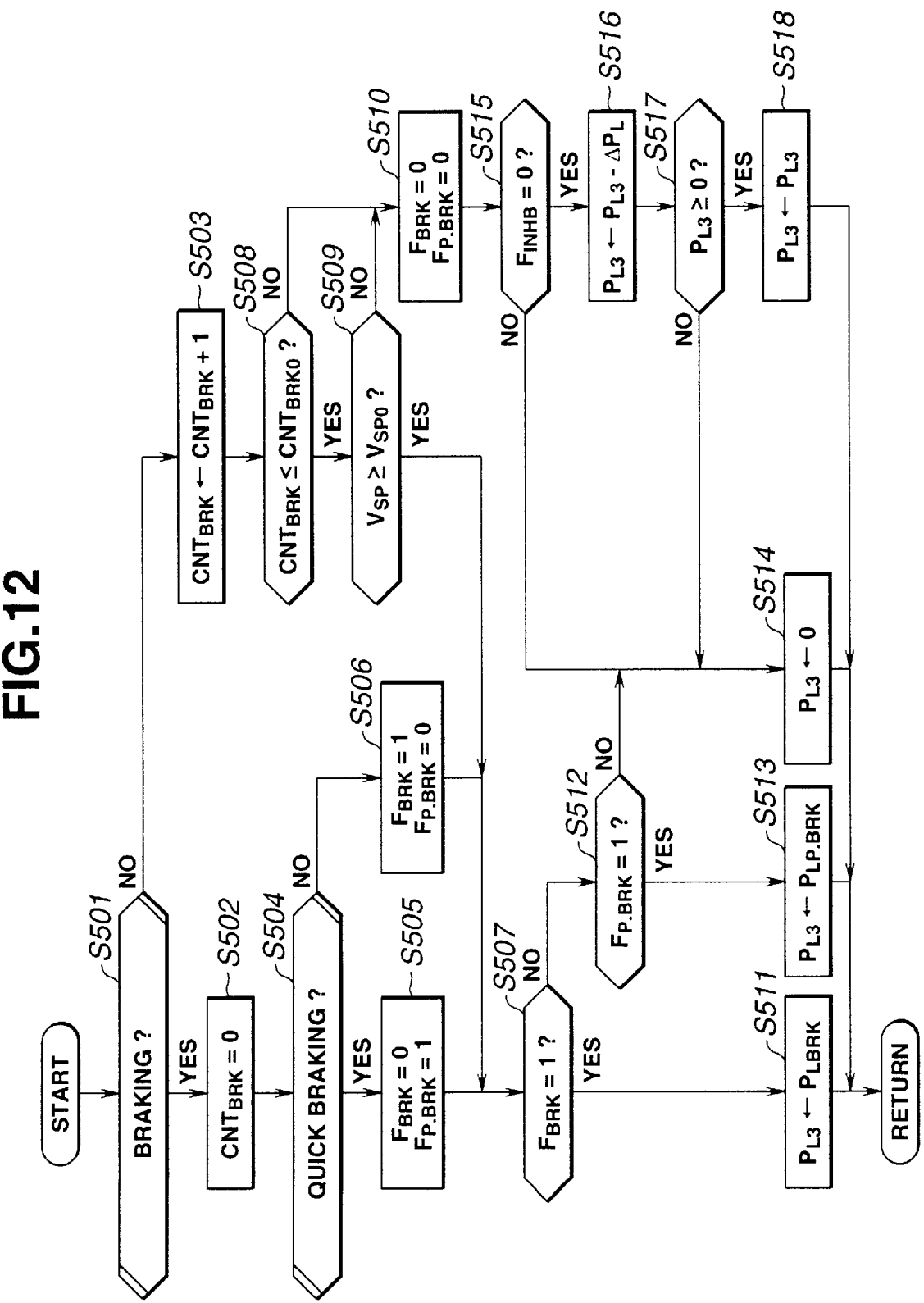
FIG. 12 is a flowchart showing a minor program of a calculation process step S15 of FIG. 7.

At a step S15, the microcomputer 310 sets a brake line pressure $P_{L3}$ by executing a process shown in FIG. 12.

Figure 13:
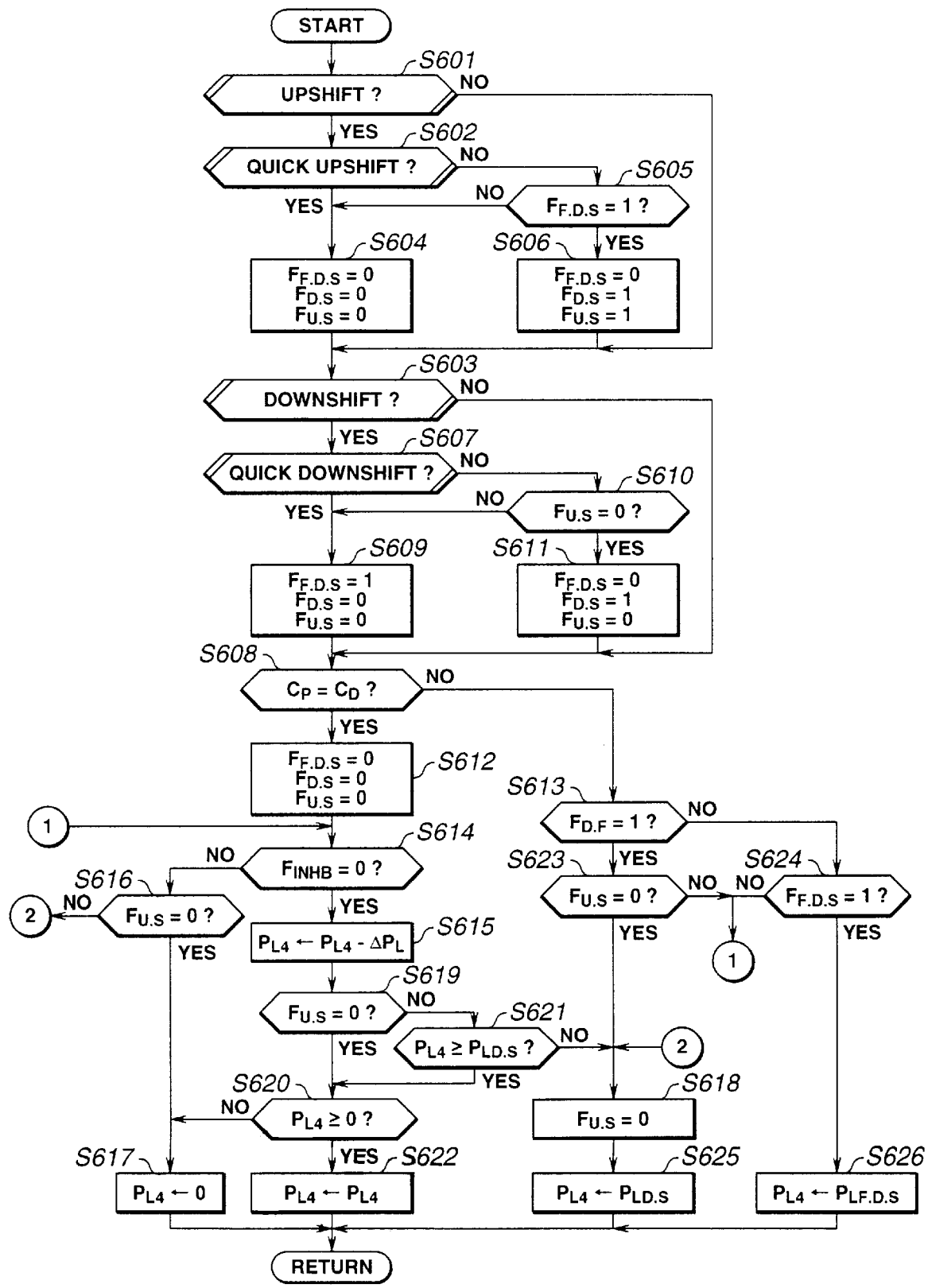
FIG. 13 is a flowchart showing a minor program of a calculation process step S16 of FIG. 7.

At a step S16, the microcomputer 310 sets a downshift line pressure $P_{L4}$ by executing a process shown in FIG. 13.

Figure 14:
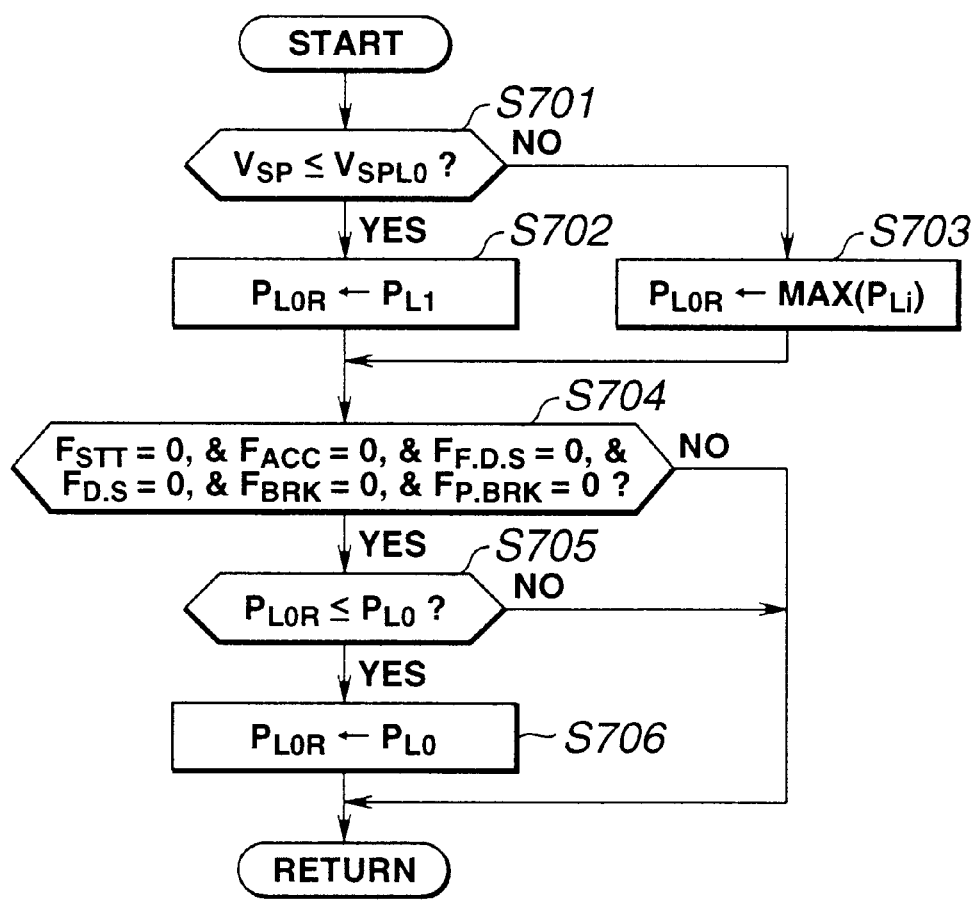
FIG. 14 is a flowchart showing a minor program of a calculation process step S17 of FIG. 7.
Figure 15:
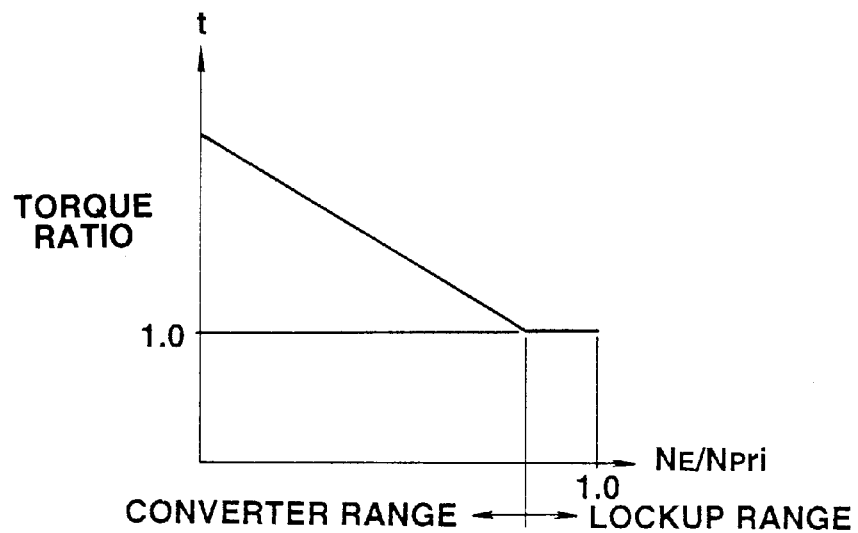
FIG. 15 is a graph showing a control map for setting a torque ratio from the torque converter input and output speed ratio.

At a step S17, the microcomputer 310 sets an objective line pressure $P_{LOR}$ by executing a process in FIG. 14.

At a step S18, the microcomputer 310 calculates a line pressure duty ratio $D/T_{PL}$ for achieving the objective line pressure $P_{LOR}$.

At a step S19, the microcomputer 310 generates and outputs a line pressure control signal according to the line pressure control duty ratio $D/T_{PL}$ according to an individually provided process. Then, the routine returns to the step S9 of FIG. 3.

A control map employed in a known duty ratio control map be applied to the control map for the line pressure control duty ratio $D/T_{PL}$. Further, a known PWM (Pulse Width Modulation) control may be employed in the generation of the line pressure control signal $S_{PL}$ according to the line pressure control duty ratio $D/T_{PL}$.

Next, with reference to the flowchart of FIG. 8, the process for setting the reference line pressure $P_{L0}$ executed at the step S11 of FIG. 7 will be discussed.

At a step S101, the microcomputer 310 calculates a torque ratio t according to the torque converter input and output speed ratio $N_E/N_{Pri}$ and an individually provided process including a retrieval of the control map. More particularly, the microcomputer 310 calculates the torque converter input/output speed ratio $N_E/N_{Pri}$ by dividing the engine revolution speed $N_E$ by the input rotation speed $N_{Pri}$. Then, the microcomputer 310 determines whether the torque converter 12 is put in a lockup state or an unlockup (converter) state with reference to the map shown in FIG. 15 according to the torque converter input/output speed ratio $N_E/N_{Pri}$. When the torque converter 12 is put in the unlock state (converter state), the microcomputer 310 obtains the torque ratio t according to the torque converter input/output speed ratio $N_E/N_{Pri}$.

At a step S102, the microcomputer 310 calculates an input torque $T_{PR1}$ by multiplying the engine toque $T_E$ by the torque ratio t ($T_{Pri}$–$T \cdot T_E$).

Figure 16:
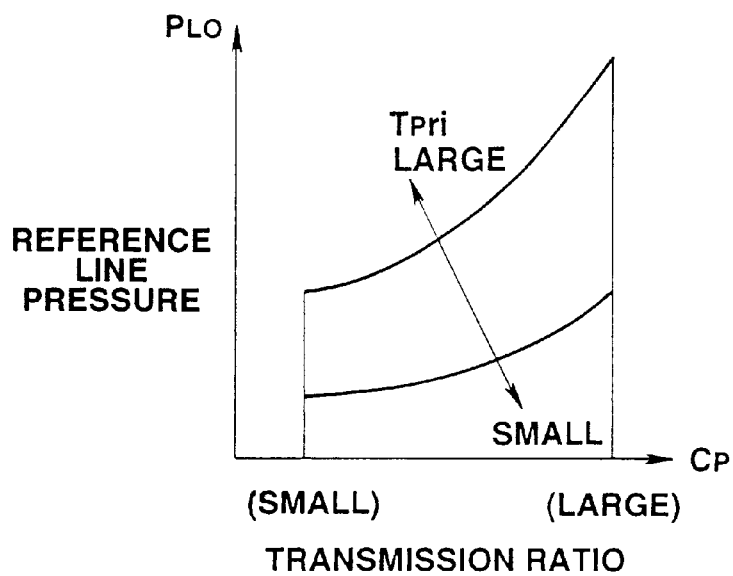
FIG. 16 is a graph showing a control map for setting a reference pressure from an input torque and the transmission ratio.

At a step S103, the microcomputer 310 calculates the reference line pressure $P_{L0}$ from the input torque $T_{Pri}$ and the transmission ratio $C_P$ according to the control map of FIG. 16. Thereafter, the routine proceeds to the step S12 of FIG. 7. The control map of FIG. 16 is a map for setting the reference line pressure $P_{L0}$ according to the input torque $T_{Pri}$ and the present transmission ratio $C_P$. Since the line pressure $P_L$ corresponds to the belt holding force, it is preferable to possibly keep the line pressure $P_L$ small in view of the durability of the belt 24 and the energy efficiency of the CVT. On the other hand, since the belt 24 is required to transmit the torque between the driver and follower pulleys 16 and 26, it is necessary to control the line pressure $P_L$ so as to prevent the belt 24 from slipping on the pulleys. That is, it is necessary to apply a necessary line pressure to the pulleys 16 and 26 to hold the belt 24 thereby. Since the torque to be transmitted by the CVT is increased according to the increase of the transmission ratio $C_P$ or the increase of the input torque $T_{PR1}$, it is necessary to increase the line pressure $P_L$ according to the increase of the transmission ratio $C_P$ or the input torque $T_{PR1}$. In order to comply with the above-mentioned requirement, the reference line pressure $P_{L0}$ is set only by the transmission ratio $C_P$ and the input torque $T_{PR1}$.

Next, with reference to a flowchart of FIG. 9, the process for setting the starting line pressure $P_{L1}$ executed at the step S12 of FIG. 7 will be discussed.

At a step S201, the microcomputer 310 determines whether or not the previous value $S_{RANGE(o-1)}$ of the shift range signal is a non-running range such as N-range or P-range. When the determination at the step S201 is affirmative, the routine proceeds to a step S202. When the determination at the step S202 is negative, the routine jumps to a step S203.

At the step S202, the microcomputer 310 determines whether or not the present value $S_{RANGE(n)}$ of the shift range signal is a running range such as D-range, 2-range, L-range or R-range. When the determination at the step S202 is affirmative, the routine proceeds to a step S204. When the determination at the step S202 is negative, the routine jumps to a step S203.

At the step S204, the microcomputer 310 sets the start control flag $F_{STT}$ at 1 ($F_{STT}$=1).

Following to the execution at the step S204, the routine proceeds to a step S205 wherein the microcomputer 310 sets the start control counter $CNT_1$ at a predetermined start control value $CNT_{STT}$. Thereafter, the routine proceeds to the step S203.

At the step S203, the microcomputer 310 determines whether the start control flag $F_{STT}$ is set at 1 or not. When the determination at the step S203 is affirmative, the routine proceeds to a step S206. When the determination at the step S203 is negative, the routine jumps to a step S207.

At the step S206, the microcomputer 310 decreases the start control counter $CNT_1$ by 1 ($CNT_1$=$CN_1$–1).

Following to the execution at the step S206, the routine proceeds to a step S208 wherein the microcomputer 310 determines whether or not the start control flag $F_{STT}$ is smaller than or equal to 0. When the determination at the step S208 is affirmative, the routine proceeds to a step S207. When the determination at the step S208 is negative, the routine proceeds to a step S209.

At the step S207, the microcomputer 310 resets the start control flag $F_{STT}$ to 0 ($F_{STT}$=0).

Following to the execution of the step S207, the routine proceeds to a step S210 wherein the microcomputer 310 sets the start line pressure $P_{L1}$ at 0 ($P_{L1} \leftarrow 0$ (MPa)).

At the step S209, the microcomputer 310 sets the start line pressure PL1 at a predetermined start value $P_{LSTT}$.

Following to the execution of the step S210 or S209, the routine returns to the step S3 of the flowchart of FIG. 7.

Next, with reference to a flowchart of FIG. 10, the process for setting the slow decompression inhibiting flag $F_{INHB}$ and the slow decompression step amount $\Delta P_L$ of the step S13 of FIG. 7 will be discussed.

At a step S301, the microcomputer 310 determines whether the start control flag $F_{STT}$ is set at 0 or not. When the determination at the step S301 is affirmative, the routine proceeds to a step S302. When the determination at the step S301 is negative, the routine jumps to a step S303.

At the step S302, the microcomputer 310 determines whether the anti-skid control system is put in an inoperative state or not. When the determination at the step S302 is affirmative, the routine proceeds to a step S304. When the determination at the step S302 is negative, the routine jumps to the step S303.

At the step S304, the microcomputer 310 resets the slow decompression inhibit flag $F_{INHB}$ at 0 ($F_{INHB}$=0).

Figure 17:
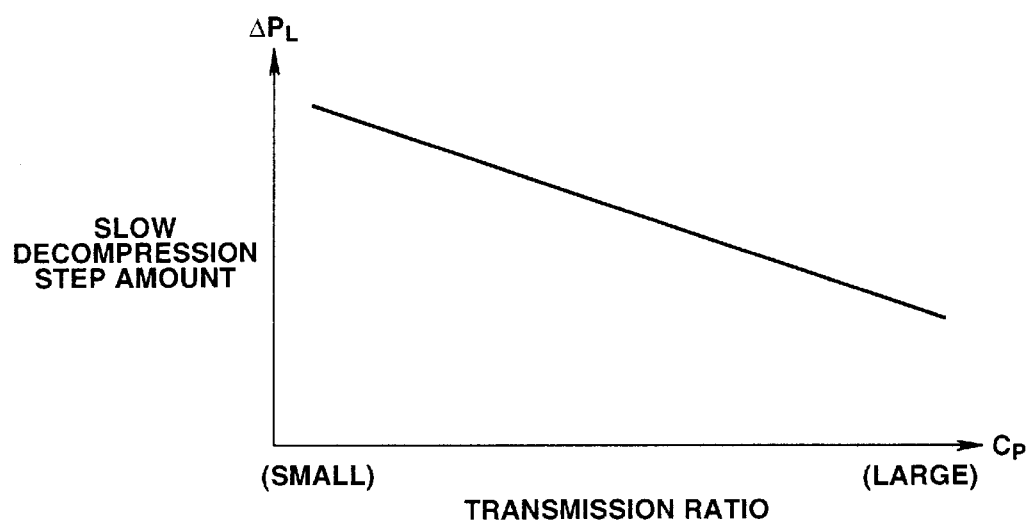
FIG. 17 is a graph showing a control map for setting a slow decompression step amount from the transmission ratio.

Following to the execution of the step S304, the routine proceeds to a step S305 wherein the microcomputer 310 sets the slow decompression step amount $\Delta P_L$ according to the transmission ratio $C_P$ and the control map of FIG. 17. The control map of FIG. 17 is provided for determining the pressure reduced amount with respect to each increasingly corrected line pressure $P_{L1}$ to $P_{L4}$ which is executed at a sampling time period ΔT. The pressure reduced amount is the slow decompression step amount $\Delta P_L$ which is decreased according to the increase of the transmission ratio $C_P$ and increased according to the decrease of the transmission ratio $C_P$.

At the step S303 following the negative determination at the step S301 or S302, the microcomputer 310 sets the slow decompression inhibit flag $F_{INHB}$ at 1 ($F_{INHB}$=1).

At a step S306 following to the execution of the step S303, the microcomputer 310 sets the slow decompression step amount $\Delta P_L$ at a preset maximum value $\Delta P_{LMAX}$.

Following to the execution of the step S305 or S306, the routine returns to the step S14 of FIG. 7.

Next, with reference to a flowchart of FIG. 11, the process for setting the quick acceleration line pressure $P_{L2}$ of the step S14 of FIG. 7 will be discussed.

At a step S401, the microcomputer 310 determines whether the quick acceleration flag $F_{ACC}$ is set at 0 or not. When the determination at the step S401 is affirmative, the routine proceeds to a step S402. When the determination at the step S401 is negative, the routine jumps to a step S403.

At the step S402, the microcomputer 310 determines whether or not an acceleration pedal is quickly depressed (the quick acceleration is executed) by executing an individually provided calculation process such as a determination process as to whether the throttle opening TVO is largely and quickly changed. When the determination at the step S402 is affirmative, the routine proceeds to a step S404. When the determination at the step S402 is negative, the routine jumps to the step S403.

At the step S404, the microcomputer 310 sets the quick acceleration flag $F_{ACC}$ at 1 ($F_{ACC}$=1).

At a step S405, the microcomputer 310 sets the quick acceleration control counter $CNT_2$ at a predetermined quick acceleration control value $CNT_{ACC}$ ($CNT_2 \leftarrow CNT_{ACC}$).

At the step S403 following to the execution of the step S405 or the negative determination at the step S401 or S402, the microcomputer determines whether or not the quick acceleration flag $F_{ACC}$ is set at 1. When the determination at the step S403 is affirmative, the routine proceeds to a step S403. When the determination at the step S403 is negative, the routine jumps to a step S407.

At the step S406, the microcomputer 310 decreases the quick acceleration control counter $CNT_2$ by 1 ($CNT_2$=$CNT_2$−1).

At a step S408 following to the execution of the step S406, the microcomputer 310 determines whether or not the quick acceleration control counter $CNT_2$ is smaller than or equal to 0. When the determination at the step S408 is affirmative, the routine proceeds to a step S409. When the determination at the step S408 is negative, the routine jumps to a step S410.

At the step S409, the microcomputer 310 sets the quick acceleration flag $F_{ACC}$ at 0 ($F_{ACC}$=0).

Following to the execution of the step S409, the routine proceeds to a step S411 wherein the microcomputer 310 determines whether or not the slow decompression inhibiting flag $F_{INHB}$ is set at 0. When the determination at the step S411 is affirmative, the routine proceeds to a step S412. When the determination at the step S411 is negative, the routine jumps to the step S407.

At the step S412, the microcomputer 310 decreases the quick acceleration line pressure $P_{L2}$ by a predetermined slow decompression step amount $\Delta P_L$ and sets the decreased value as the quick acceleration line pressure $P_{L2}$ ($P_{L2} \leftarrow P_{L2} - \Delta P_L$)

At a step S413, the microcomputer 310 determines whether or not the quick acceleration line pressure $P_{L2}$ is higher than or equal to 0. When the determination at the step S413 is affirmative, the routine proceeds to a step S414. When the determination at the step S413 is negative, the routine jumps to the step S407.

At the step S414 following to the affirmative determination at the step S413, the microcomputer 310 sets the calculated quick acceleration line pressure $P_{L2}$ as it is ($P_{L2} \leftarrow P_{L2}$).

At the step S407 following to the negative determination at the step S403, S411 or S413, the microcomputer 310 sets 0 as the quick acceleration line pressure $P_{L2}$ ($P_{L2} \leftarrow 0$).

At the step S410 following to the negative determination at the step S408, the microcomputer 310 sets the predetermined quick acceleration value $P_{LACC}$ as the quick acceleration line pressure ($P_{L2} \leftarrow P_{LACC}$).

Following to the executions of the step S407, S410 or S414, the routine returns to the step S15 of FIG. 7.

Next, with reference to a flowchart of FIG. 12, the process for setting the brake line pressure $P_{L2}$ of the step S15 of FIG. 7 will be discussed.

At a step S501, the microcomputer 310 determine whether or not a brake pedal is now depressed. More particularly, by detecting whether a brake switch is turned ON or OFF and by executing individual processing according to the condition of the brake switch, the microcomputer 310 determines whether or not the braking is now executed. When the determination at the step S501 is affirmative, the routine proceeds to a step S502. When the determination at the step S501 is negative, the routine proceeds to a step S503.

At the step S502, the microcomputer 310 clears a brake control counter $CNT_{BRK}$ ($CNT_{BRK}$=0).

Following to the execution of the step S502, the routine proceeds to a step S504 wherein the microcomputer 310 determines whether or not a quick braking is executed. That is, it is determined whether or not the brake pedal is largely and quickly depressed. It will be understood that if a quick brake assist system is employed in a vehicle comprising the control system according to the present invention the determination as to the quick braking may be executed by determining whether the quick brake assist system is operated or not. When the determination at the step S504 is affirmative, the routine proceeds to a step S505. When the determination at the step S504 is negative, the routine proceeds to a step S506.

At the step S505, the microcomputer 310 sets a brake control flag $F_{BRK}$ at 0 ($F_{BRK}$=0) and sets a quick brake control flag $F_{P.BRK}$ at 1 ($F_{P.BRK}$=1).

At the step S506, the microcomputer 310 sets a brake control flag $F_{BRK}$ at 1 ($F_{BRK}$=1) and sets a quick brake control flag $F_{P.BRK}$ at 0 ($F_{P.BRK}$=0).

After the execution of the step S505 or S506, the routine proceeds to a step S507.

On the other hand, at the step S503, the microcomputer 310 counts up the brake control counter $CNT_{BRK}$ by 1 ($CNT_{BRK}$=$CNT_{BRK}$+1).

Following to the execution of the step S503, the routine proceeds to a step S508 wherein the microcomputer 310 determines whether or not the brake control counter $CNT_{BRK}$ is smaller than or equal to a predetermined value $CNT_{BRK0}$. When the determination at the step S508 is affirmative, the routine proceeds to a step S509. When the determination at the step S508 is negative, the routine proceeds to a step S510.

At the step S509, the microcomputer 310 determines whether or not the vehicle speed $V_{SP}$ is greater than or equal to a predetermined low speed value $V_{SP0}$. When the determination at the step S509 is affirmative, the routine proceeds to the step S507. When the determination at the step S509 is negative, the routine proceeds to the step S510.

At the step S507, the microcomputer 310 determines whether or not the brake control flag $F_{BRK}$ is equal to 1. When the determination at the step S507 is affirmative, the routine proceeds to a step S511. When the determination at the step S507 is negative, the routine proceeds to a step S512.

At the step S512, the microcomputer 310 determines whether or not the quick brake control flag $F_{P.BRK}$ is equal to 1. When the determination at the step S512 is affirmative, the routine proceeds to a step S513. When the determination at the step S512 is negative, the routine proceeds to a step S514.

At the step S510 following to the negative determination at the step S508 or S509, the microcomputer 310 sets a brake control flag $F_{BRK}$ at 0 ($F_{BRK}$=0) and sets a quick brake control flag $F_{P.BRK}$ at 0 ($F_{P.BRK}$=0).

Following to the execution of the step S510, the routine proceeds to a step S515 wherein the microcomputer 310 determines whether or not the slow decompression control inhibition flag $F_{INHB}$ is equal to 0. When the determination at the step S515 is affirmative, the routine proceeds to a step S516. When the determination at the step S515 is negative, the routine proceeds to the step S514.

At the step S516, the microcomputer 310 decreases the brake line pressure $P_{L3}$ by the slow decompression step amount $\Delta P_L$ and sets the subtracted brake line pressure at the brake line pressure $P_{L3}$ ($P_{L3} \leftarrow P_{L3} - \Delta P_L$).

Following to the execution of the step 516, the routine proceeds to a step S517 wherein the microcomputer 310 determines whether or not the brake line pressure is greater than or equal to 0. When the determination at the step S517 is affirmative, the routine proceeds to a step S518. When the determination at the step S517 is negative, the routine proceeds to the step S518.

At the step S514, the microcomputer 310 sets the brake line pressure $P_{L3}$ at 0 ($P_{L3} \leftarrow 0$). After the execution of the step S514, the routine returns to the step S6 of FIG. 7.

At the step S518 following to the negative determination of the step S517, the microcomputer 310 maintains the brake line pressure $P_{L3}$ ($P_{L3} \leftarrow P_{L3}$). After the execution of the step S518, the routine returns to the step S16 of FIG. 7.

At the step S511 following to the affirmative determination at the step S507, the microcomputer 310 sets the brake line pressure $P_{L3}$ at a predetermined large brake value $P_{LBRK}$ ($P_{L3} \leftarrow P_{LBRK}$). After the execution of the step S511, the routine returns to the step S16 of FIG. 7.

At the step S513 following to the affirmative determination at the step S512, the microcomputer 310 sets the brake line pressure $P_{L3}$ at a predetermined further large value $P_{LP.LBRK}$ ($P_{L3} \leftarrow P_{LP.LBRK}$). After the execution of the step S513, the routine returns to the step S16 of FIG. 7.

Next, with reference to a flowchart of FIG. 13, the process for setting the brake downshift line pressure $P_{L4}$ of the step S16 of FIG. 7 will be discussed.

At a step S601, the microcomputer 310 determines whether an upshift is executed or not, by executing an individual processing for determining whether the transmission ratio of a present shift range is smaller than that of a previous shift range or not. When the determination at the step S601 is affirmative, the routine proceeds to a step S602. When the determination at the step S601 is negative, the routine jumps to a step S603.

At the step S602, the microcomputer 310 determines whether a quick upshift such as a two-steps upshift is executed or not, by determining, for example, whether the present shift range is D-range with respect to a fact that the previous shift range is the L-range. When the determination at the step S602 is affirmative, the routine proceeds to a step S604. When the determination at the step S602 is negative, the routine proceeds to a step S605.

At the step S605, the microcomputer 310 determines whether a quick downshift control flag $F_{F.D.S}$ is set at 1 or not. When the determination at the step S605 is affirmative, the routine proceeds to a step S606. When the determination at the step S605 is negative, the routine proceeds to the step S604.

At the step S604, the microcomputer 310 sets a quick downshift control flag $F_{F.D.S}$, a downshift control flag $F_{D.S}$ and a special downshift control flag $F_{U.S}$ at 0 ($F_{F.D.S}$=0, $F_{D.S}$=0, $F_{U.S}$=0).

At the step S606, the microcomputer 310 sets the quick downshift control flag $F_{F.D.S}$ at 0 and sets the downshift control flag $F_{D.S}$ and the special downshift control flag $F_{U.S}$ at 1 ($F_{F.D.S}$=0, $F_{D.S}$=1, $F_{U.S}$=1).

Following to the execution of the step S604 or S606 or the negative determination at the step S601, the routine proceeds to the step S603 wherein the microcomputer 310 determines whether a downshift is executed or not, by executing an individual processing for determining whether a transmission ratio of a present shift range is greater than that of a previous shift range or not. When the determination at the step S603 is affirmative, the routine proceeds to a step S607. When the determination at the step S603 is negative, the routine jumps to a step S608.

At the step S607, the microcomputer 310 determines whether a quick downshift such as a two-steps downshift is executed or not, by determining, for example, whether the present shift range is L-range with respect to a fact that the previous shift range is D-range. When the determination at the step S607 is affirmative, the routine proceeds to a step S609. When the determination at the step S607 is negative, the routine proceeds to a step S610.

At the step S610, the microcomputer 310 determines whether the special upshift control flag $F_{U.S}$ is set at 0 or not. When the determination at the step S610 is affirmative, the routine proceeds to a step S611. When the determination at the step S610 is negative, the routine proceeds to the step S609.

At the step S609, the microcomputer 310 sets the quick downshift control flag $F_{F.D.S}$ at 1 and sets the downshift control flag $F_{D.S}$ and the special downshift control flag $F_{U.S}$ at 0 ($F_{F.D.S}$=1, $F_{D.S}$=0, $F_{U.S}$=0).

At the step S611, the microcomputer 310 sets the quick downshift control flag $F_{F.D.S}$ and the special downshift control flag $F_{U.S}$ at 0 and sets the downshift control flag $F_{D.S}$ at 1 ($F_{F.D.S}$=0, $F_{D.S}$=1, $F_{U.S}$=0).

Following to the execution of the step S609 or S611 or the negative determination at the step S603, the routine proceeds to the step S608 wherein the microcomputer 310 determines whether the present transmission ratio $C_P$ is equal to the goal transmission ratio $C_D$ or not. When the determination at the step S608 is affirmative, the routine proceeds to a step S612. When the determination at the step S608 is negative, the routine proceeds to a step S613.

At the step S612, the microcomputer 310 sets the quick downshift control flag $F_{F.D.S}$, the downshift control flag $F_{D.S}$ and the special downshift control flag $F_{U.S}$ at 0 ($F_{F.D.S}$=0, $F_{D.S}$=0, $F_{U.S}$=0).

Following to the execution at the step S612, the routine proceeds to a step S614 wherein the microcomputer 310 determines whether the slow decompression inhibiting flag $F_{INHB}$ is set at 0 or not. When the determination at the step S614 is affirmative, the routine proceeds to a step S615. When the determination at the step S614 is negative, the routine proceeds to a step S616.

At the step S616, the microcomputer 310 determines whether the special upshift control flag $F_{U.S}$ is set at 0 or not. When the determination at the step S616 is affirmative, the routine proceeds to a step S617. When the determination at the step S616 is negative, the routine jumps to a step S618.

At the step S615 following to the affirmative determination at the step S614, the microcomputer 310 decreases the downshift line pressure $P_{L4}$ by the slow decompression step amount $\Delta P_L$ and stores the decreased downshift line pressure as the downshift line pressure $P_{L4}$($P_{L4} \leftarrow P_{L4} - \Delta P_L$).

Following to the execution of the step S615, the routine proceeds to a step S619 wherein the microcomputer 310 determines whether the special upshift control flag $F_{U.S}$ is set at 0 or not. When the determination at the step S619 is affirmative, the routine proceeds to a step S620. When the determination at the step S619 is negative, the routine proceeds to a step S621.

At the step S621, the microcomputer 310 determines whether or not the downshift line pressure $P_{L4}$ is greater than or equal to a predetermined relatively large downshift value $P_{LD.S}$. When the determination at the step S621 is affirmative, the routine proceeds to the step S620. When the determination at the step S621 is negative, the routine proceeds to the step S618.

At the step S620 following to the affirmative determination at the step S619 or S621, the microcomputer 620 determines whether or not the newly calculated downshift line pressure $P_{L4}$ is greater than or equal to 0 (MPs). When the determination at the step S620 is affirmative, the routine proceeds to a step S622. When the determination at the step S622 is negative, the routine proceeds to the step S617.

At the step S617, the microcomputer 310 sets the downshift line pressure $P_{L4}$ at 0 ($P_{L4} \leftarrow 0$). Then, the routine returns to the step S17 of FIG. 7.

At the step S622, the microcomputer 310 maintains the downshift line pressure $P_{L4}$ as it is ($P_{L4} \leftarrow P_{L4}$). Then, the routine returns to the step S17 of FIG. 7.

On the other hand, at the step S613 following to the negative determination at the step S608, the microcomputer 310 determines whether the downshift control flag $F_{D.S}$ is set at 0 or not. When the determination at the step S613 is affirmative, the routine proceeds to a step S623. When the determination at the step S624 is negative, the routine proceeds to a step S624.

At the step S623, the microcomputer 310 determines whether the special upshift control flag $F_{U.S}$ is set at 0 or not. When the determination at the step S623 is affirmative, the routine proceeds to the step S618. When the determination at the step S623 is negative, the routine jumps to the step S614.

At the step S619 following to the negative determination at the step S623, S621 or S616, the microcomputer 310 sets the special upshift control flag $F_{U.S}$ at 0 ($F_{U.S}$=0).

At a step S625 following to the execution of the step S618, the microcomputer 310 sets the downshift line pressure $P_{L4}$ at the predetermined downshift value $P_{LD.S}$ ($P_{L4} \leftarrow P_{LD.S}$). Then, the routine returns the step S7 of FIG. 7.

At the step S624 following to the negative determination at the step S613, the microcomputer 310 determines whether the quick downshift control flag $F_{F.D.S}$ is set at 1 ($F_{F.D.S}$=1). When the determination at the step S624 is affirmative, the routine proceeds to a step S626. When the determination at the step S624 is negative, the routine jumps to the step S614.

At the step S626, the microcomputer 310 sets the downshift line pressure $P_{L4}$ at a predetermined large downshift value $P_{LF.D.S}$ which is further larger than the predetermined downshift value $P_{LD.S}$ ($P_{L4} \leftarrow P_{LF.D.S}$). Then, the routine returns the step S17 of FIG. 7.

Next, with reference to a flowchart of FIG. 14, the process for setting the objective line pressure $P_{LOR}$ of the step S17 of FIG. 7 will be discussed.

At a step S701, the microcomputer 310 determines whether or not the vehicle speed $V_{SP}$ is smaller than or equal to a predetermined start speed $V_{SPLO}$. When the determination at the step S701 is affirmative, the routine proceeds to a step S702. When the determination at the step S701 is negative, the routine proceeds to a step S703.

At the step S702, the microcomputer 310 sets the objective line pressure $P_{LOR}$ at the start line pressure $P_{L1}$ ($P_{LOR} \leftarrow P_{L1}$).

At the step S703 following to the negative determination of the step S701, the microcomputer 310 sets the objective line pressure $P_{LOR}$ at a largest one of the set line pressures $P_{L1}$ to $P_{L4}$ ($P_{LOR}$=MAX($P_{Li}$) where i=1,2,3 and 4).

Following to the execution of the step S702 or S703, the routine proceeds to a step S704 wherein the microcomputer 310 determines whether all of the start control flag $F_{STT}$, the quick acceleration control flag $F_{ACC}$, the brake control flag $F_{BRK}$, the quick brake control flag $F_{P.BRK}$, the downshift control flag $F_{D.S}$ and the quick downshift control flag $F_{F.D.S}$ are 0 or not. When the determination at the step S704 is affirmative, the routine proceeds to a step S705. When the determination at the step S704 is negative, the routine proceeds to a return step from which the routine proceeds to the step S18 of FIG. 7.

At the step S705, the microcomputer 310 determines whether the objective line pressure $P_{LOR}$ is smaller than or equal to the reference line pressure $P_{LO}$. When the determination at the step S705 is affirmative, the routine proceeds to a step S706. When the determination at the step S705 is negative, the routine jumps to the return step.

At the step S706, the microcomputer 310 sets the objective line pressure $P_{LOR}$ at the reference line pressure $P_{LO}$ ($P_{LOR} \leftarrow P_{LO}$). Then, the routine proceeds to the return routine to proceed to the step S18 of FIG. 7.

Hereinafter, the operation of the line pressure control enabled by the processing of FIG. 7 will be discussed in detail.

First, as to the setting of the line pressures $P_{LO}$ to $P_{L4}$ except for the start line pressure $P_{L1}$, the explanation will be given.

The reference line pressure $P_{LO}$ generates a belt holding force to prevent the slippage of the belt which receives a power obtained by converting the input torque $T_{Pri}$ (the multiple of the engine torque $T_E$ and the torque ratio t) by the transmission ratio. Therefore, the reference line pressure $P_{LO}$ is not basically related with the change of the load of the output system. That is, only the right direction input load may be taken in account of the reference line pressure $P_{LO}$.

In the minor program of FIG. 11 for setting the quick acceleration line pressure $P_{L2}$, when the quick acceleration control flag $F_{ACC}$ is reset ($F_{ACC}$=0) and when the acceleration pedal is quickly depressed, the routine proceeds through the steps S401 and S402 to the step S404 wherein the quick acceleration control flag $F_{ACC}$ is set ($F_{ACC}$=1). Next, at the step S405, the quick acceleration counter $CNT_2$ is set at the predetermined value $CNT_{ACC}$. That is, since this minor program is arranged to set the quick acceleration control flag $F_{ACC}$ ($F_{ACC}$=1) when the acceleration pedal is quickly depressed, the reset of the quick acceleration control flag $CNT_2$ is not executed hereinafter. Once the quick acceleration flag $F_{ACC}$ is set($F_{ACC}$=1), the flow in which the routine proceeds from the step S408 to the step S410 is repeated until the quick acceleration control counter $CNT_2$ decreased at the step S406 becomes smaller than 0 ($CNT_2$<0). Therefore, the quick acceleration line pressure $P_{L2}$ is held at the relatively large value $P_{LACC}$. Thereafter, when the quick acceleration control counter $CNT_2$ becomes smaller than 0 according to the elapse of the predetermined time period corresponding to the quick acceleration value $CNT_{ACC}$ and when the slow decompression inhibit flag $F_{INHB}$ is held in reset condition ($F_{INHB}$=0), the routine proceeds from the step S411 to the step S412 wherein the previous quick acceleration line pressure $P_{L2}$ is decreased by the slow decompression step amount $\Delta P_L$ ($P_{L2} \leftarrow P_{L2} - \Delta P_L$). Until the new quick acceleration line pressure $P_{L2}$ is smaller than or equal to 0, the affirmative determination at the step S413 is repeated. Therefore, the quick acceleration line pressure $P_{L2}$ is decreased by the step amount $\Delta P_L$ at each sampling time period $\Delta T$. When the quick acceleration line pressure $P_{L2}$ becomes smaller than or equal to 0, the routine proceeds from the step S413 to the step S407 wherein the quick acceleration line pressure $P_{L2}$ is held at 0. That is, the quick acceleration line pressure $P_{L2}$ is steppingly increased when the acceleration pedal is quickly depressed and is then held at the predetermined value $P_{LACC}$ for a predetermined time period $CNT_{ACC}$. Thereafter, it is gradually decreased and is held at 0 (MPa).

In the minor program of FIG. 12 for setting the brake line pressure $P_{L3}$, when the brake pedal is depressed, the routine proceeds from the step S501 to the step S502 wherein the brake control counter $CNT_{BRK}$ is cleared ($CNT_{BRK}$=0). If the braking is a quick braking, the routine proceeds to the step S505 wherein the quick brake control flag $R_{P.BRK}$ is set ($R_{P.BRK}$=1). If the braking is a normal braking, the routine proceeds to the step S506 wherein the brake control flag $F_{BRK}$ is set ($F_{BRK}$=1). The quick brake control flag $F_{P.BRK}$ and the brake control flag $F_{BRK}$ never take the same condition, that is, when one of them is set, the other is reset. When the brake control flag $F_{BRK}$ is set ($F_{BRK}$=1), that is, when the brake pedal is normally operated, the flow from the step S507 to the step S511 is repeated. Therefore, the brake line pressure is held at the further large value $P_{LP.BRK}$. When the depression of the brake pedal is cancelled, the routine proceeds from the step S501 to the step S503. In this flow following to the step S503, until the braking control counter $CNT_{BRK}$ becomes greater than the predetermined value $CNT_{BRKO}$ or until the vehicle speed is smaller than the predetermined low value $V_{SPO}$, the routine proceeds from the step S508 to the step S507 through the step S509. Therefore, the brake line pressure $P_{L3}$ is held at the predetermined brake value $P_{LBRK}$ or the predetermined quick brake value $L_{P.BRK}$.

When the brake control counter $CNT_{BRK}$ becomes greater than the predetermined value $CNT_{BRKO}$ or when the vehicle speed $V_{SP}$ becomes smaller than the predetermined low speed value $V_{SPO}$, the routine proceeds from the step S508 or S509 to the step S510 wherein the brake control flag $F_{BRK}$ and the quick brake control flag $F_{P.BRK}$ are reset ($F_{BRK}$=0, $F_{P.BRK}$=0). At this moment, if the slow decompression inhibit flag $F_{INHB}$ is still put in the reset condition ($F_{INHB}$=0), the routine proceeds from the step S515 to the step S516 wherein the previous brake line pressure $P_{L3}$ is decreased by the slow decompression step amount $\Delta P_L$. Until the new brake line pressure $P_{L3}$ becomes smaller than 0 (MPa), the determination at the step S517 is affirmative, and therefore the routine proceeding from the step S517 to the step S518 is repeated. Accordingly, the brake line pressure $P_{L3}$ is decreased by the slow decompression step amount $\Delta P_L$ at each sampling time period. When this reduced brake line pressure $P_{L3}$ becomes smaller than 0 (Mpa), the brake line pressure $P_{L3}$ is held at 0 ($P_{L3} \leftarrow 0$) because the determination at the step S517 becomes negative and the routine proceeds from the step S517 to the step S514. That is, the brake line pressure $P_{L3}$ is steppingly increased during the operation of the brake pedal and reaches the predetermined value $P_{LBRK}$ or the predetermined quick brake value $P_{LP.BRL}$. After the cancellation of the braking operation, the increased brake line pressure $P_{L3}$ is held for the predetermined time period $CNT_{BRKO}$. Thereafter, it is gradually decreased and is held at 0 (MPa).

As to the minor program of FIG. 13 for setting the downshift line pressure $P_{L4}$, the operation under the situation that the downshift is executed will be first discussed. In case that the special upshift control flag $F_{U.S}$ is held in the reset condition ($F_{U.S}$=0), when the downshift is executed, the routine proceeds from the step S603 to the step S607 wherein it is determined whether the quick downshift is executed. When the quick downshift is executed, that is, when the shift range is shifted from the D-range to the L-range, the routine proceeds to the step S609 wherein only the quick downshift control flag $F_{F.D.S}$ is set ($F_{F.D.S}$=1). When the normal downshift is executed, that is, when the shift range is shifted from the D-range to the 2-range or from the 2-range to the L-range, the routine proceeds through the step S610 to the step S611 wherein only the downshift control flag $F_{D.S}$ is set ($F_{D.S}$=1). Since the present transmission ratio $C_F$ is not adjusted to the goal transmission ratio $C_D$ in this normal downshift, the routine proceeds from the step S608 to the step S613 wherein it is determined whether the downshift control flag $F_{D.F}$ is set at 1. When the determination at the step S613 is affirmative ($F_{D.F}$=1), that is, when the normal downshift is executed, the routine repeatingly proceeds from the step S613 through the step S623 and the step S618 to the step S625. Therefore, the downshift line pressure $P_{L4}$ is held at the predetermined relatively large value $P_{LD.S}$. On the other hand, during the quick downshift, the routine repeatingly proceeds from the step S613 through the step S624 to the step S626. Therefore, the downshift line pressure $P_{L4}$ is held at the predetermined further large value $P_{LF.D.S}$.

When the present transmission ratio $C_P$ corresponds with the goal transmission ratio $C_D$, that is, when the necessary shifting is completed, the routine proceeds from the step S608 to the step S612 wherein the downshift control flag $F_{D.S}$ and the quick downshift control flag $F_{F.DD.S}$ are reset ($F_{D.S}$=0, $F_{F.D.S}$=0). Following this step, if the slow decompression inhibit flag $F_{INHB}$ is still set in the reset condition ($F_{INHB}$=0), the routine proceeds from the step S614 to the step S615 wherein the previous downshift line pressure $P_{L4}$ is decreased by the slow decompression step amount $\Delta P_L$. Until the new downshift line pressure $P_{L4}$ becomes smaller than 0 (Mpa), the flow proceeding from the step S619 through the step S620 to the step S622 is repeated. Therefore, the downshift line pressure $P_{L4}$ is set to be decreased by the slow decompression step amount $\Delta P_L$ at each sampling time period $\Delta T$. When the downshift line pressure $P_{L4}$ becomes smaller than 0 (Mpa), the routine proceeds from the step S620 to the step S617 wherein the downshift line pressure $P_{L4}$ is held at 0 (MPa) ($P_{L4} \leftarrow 0$). That is, the downshift line pressure $P_{L4}$ is steppingly increased to the predetermined downshift value $P_{LD.S}$ or the predetermined quick downshift value $P_{LP.BRK}$ during the downshift operation. Further, the downshift line pressure $P_{L4}$ is held until the shifting is completed. Thereafter, the downshift line pressure $P_{L4}$ is gradually decreased and held at 0 (MPa).

When the upshift operation is detected at the step S601, the routine proceeds to the step S602 wherein it is determined whether the quick upshift is executed. When the quick upshift is executed, the routine proceeds to the step S604 wherein all control flags in this minor program are reset. When it is not executed and when the quick downshift control flag $F_{F.D.S}$ is set, that is, when the quick downshift operation has been executed previously and when the shifting is not yet completed, the shift position is upshifted by one step. That is, when the downshift is executed from the D-range to the L-range and when the upshift is executed from the L-range to the 2-range slightly after the downshift, the routine proceeds from the step S605 to the step S606 wherein the downshift control flag $F_{D.S}$ and the special upshift control flag $F_{U.S}$ are set ($F_{D.S}=1$, $F_{U.S}=1$). Even if this abnormal shifting is executed, when the actual shifting is completed, the routine proceeds from the step S608 to the step S612 wherein all flags are reset (all flags=0). When the special upshift control flag $F_{U.S}$ is set and the normal downshift is executed, that is, when the shift range is changed from the D-range through 2-range to L-range, the routine proceeds from the step S610 to the step S609 wherein only the quick downshift control flag $F_{F.D.S}$ is again set ($F_{F.D.D}=1$).

Under this situation, it is necessary to decrease the downshift line pressure $P_{L4}$ from the predetermined quick downshift value $P_{LF.D.S}$ to the predetermined downshift value $P_{LD.S}$. When the downshift control flag $F_{D.S}$ and the special upshift control flag $F_{U.S}$ are set ($F_{D.S}=1$, $F_{U.S}=1$), the routine proceeds from the step S613 through the step S623 to the step S614. Therefore, the downshift line pressure $P_{L4}$ is forcibly decreased. Herein, since the slow decompression inhibit flag $F_{INHB}$ is put in the reset condition ($F_{INHB}=0$), the routine proceeds from the step S615 through the step S619 to the step S621. That is, when the downshift line pressure $P_{L4}$ which is slowly decreased by the slow decompression step amount $\Delta P_L$ becomes smaller than the predetermined downshift value $P_{LD.S}$, the routine proceeds to the step S618 wherein the special upshift control flag $F_{U.S}$ is reset. Thereafter, the downshift line pressure $P_{L4}$ is held at the predetermined downshift value $P_{LD.S}$.

After the reference line pressure $P_{L0}$, the quick acceleration line pressure $P_{L2}$, the brake line pressure $P_{L3}$ and the downshift line pressure $P_{L4}$ are set, the minor program of FIG. 14 for setting the objective line pressure $P_{LOR}$ is executed. Even if the start line pressure $P_{L1}$ has been set, substantially the set condition is the same. When the vehicle speed $V_{SP}$ is greater than the predetermined start value $V_{SPLO}$, the routine proceeds from the step S701 to the step S703 wherein the maximum value among the set line pressures $P_{L1}$, $P_{L2}$, $P_{L3}$, $P_{L4}$ is once set as the objective line pressure $P_{LOR}$. When all the flags are reset and when the objective line pressure $P_{LOR}$ is smaller than or equal to the reference line pressure $P_{L0}$, the routine proceeds through the steps S704 and S705 to the step S706 wherein the objective line pressure $P_{LOR}$ is set at the reference line pressure $P_{L0}$. That is, when the set line pressures $P_{L1}$ to $P_{L4}$ except for the reference line pressure $P_{L0}$ is set according to the vehicle condition, the maximum value among them is basically set as the objective line pressure $P_{LOR}$ so as to set the line pressure $P_L$ for preventing the generation of the slippage of the belt according to the condition. In contrast, when the set line pressures $P_{L1}$ to $P_{L4}$ are not set or positively not set and when the reference line pressure $P_{L0}$ according to the input torque $T_{Pri}$ from the engine is larger than the line pressures $P_{L1}$ to $P_{L4}$, the objective lens pressure $P_{LOR}$ is set at the reference line pressure $P_{L0}$. This enables the line pressure for preventing the slippage of the belt against the input load from the engine to be supplied.

Figure 18A:
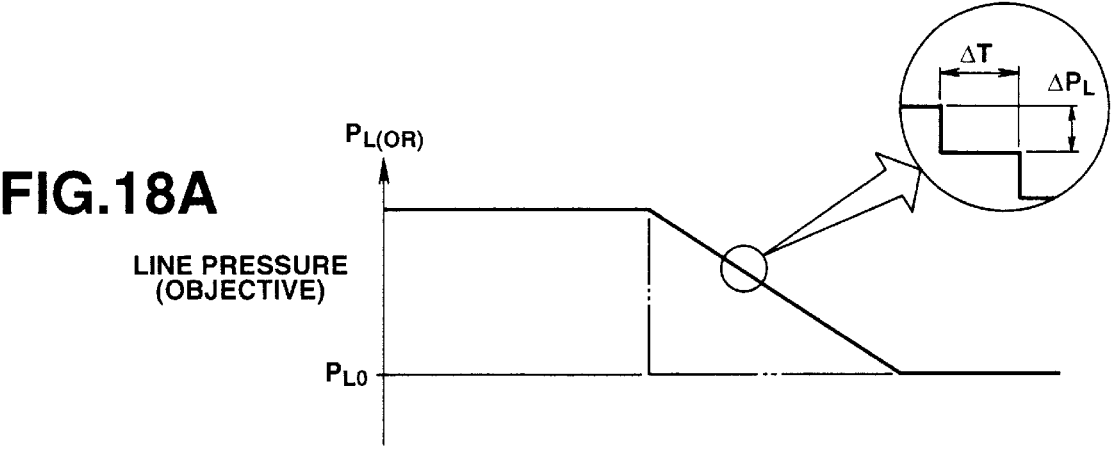
FIGS. 18A to 18C are time charts showing a result of the calculating processes of FIG. 7.
Figure 18B:
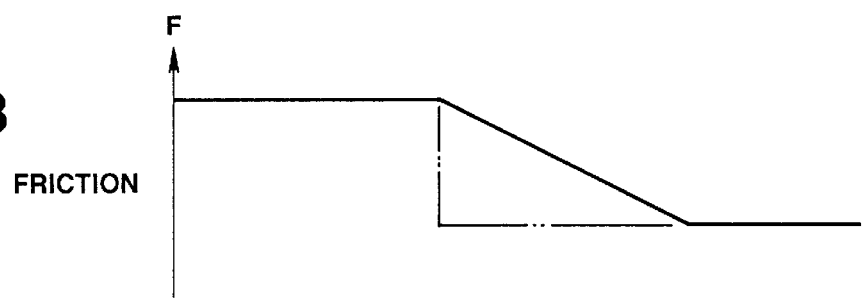
Figure 18C:
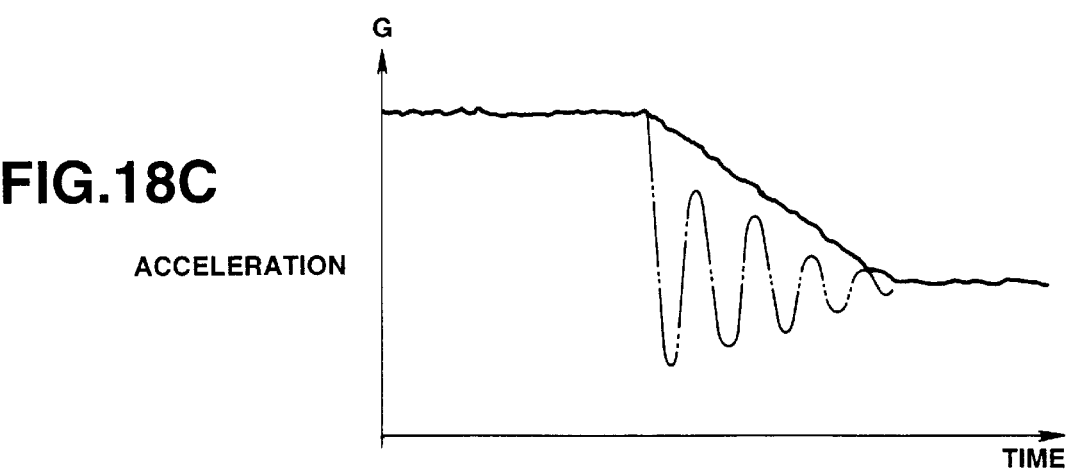
Figure 19A:
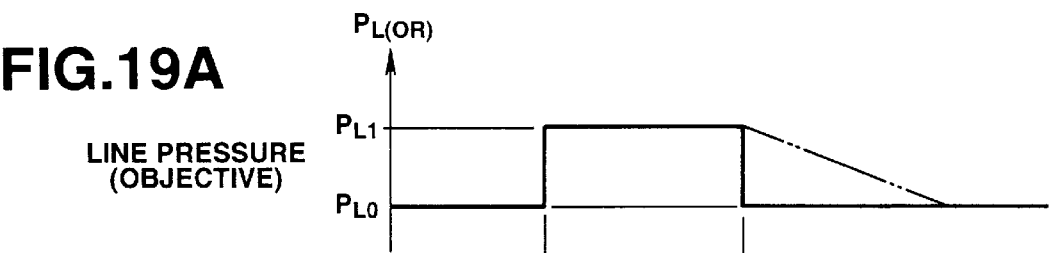
FIGS. 19A and 19B are time charts showing a result of the calculating processes of FIG. 7.
Figure 19B:
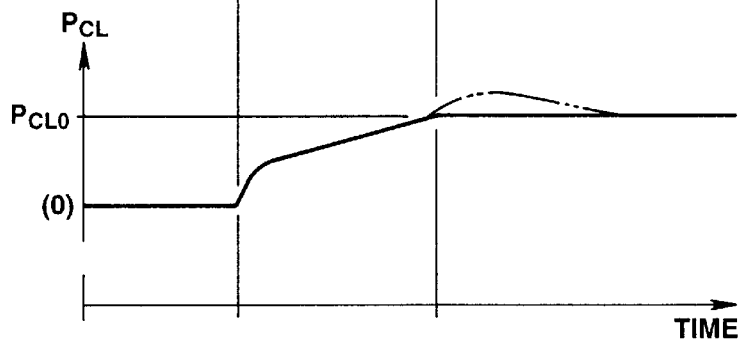
Figure 20A:
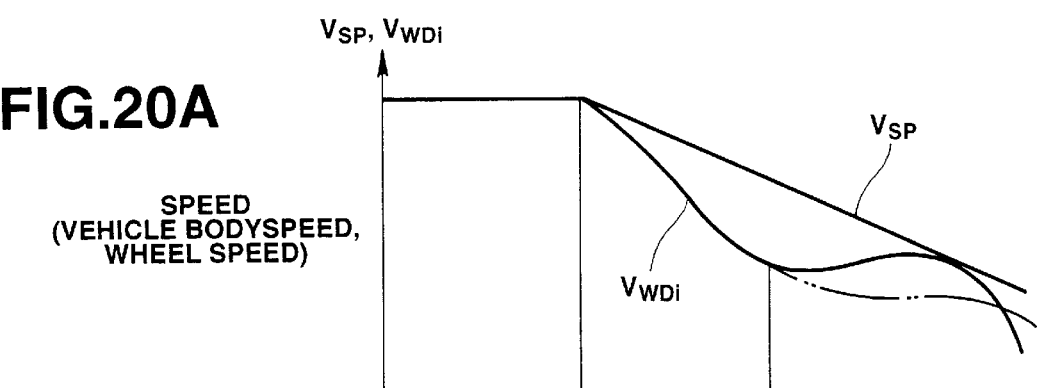
FIGS. 20A to 20B are time charts showing a result of the calculating processes of FIG. 7.
Figure 20B:
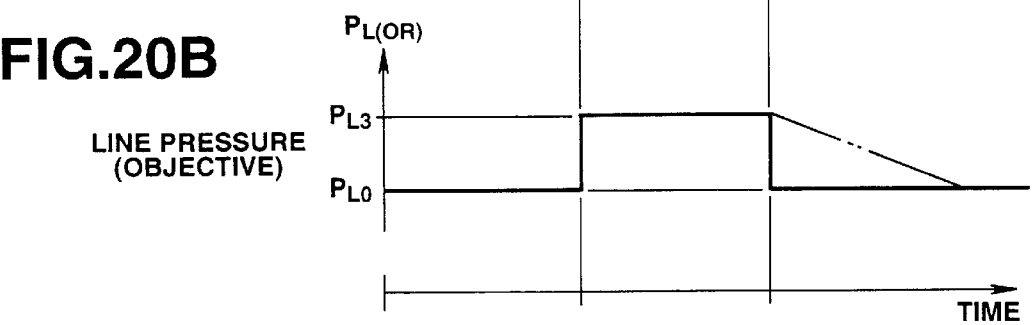

Herein, when one of the set line pressures $P_{L2}$ to $P_{L4}$, except the start line pressure $P_{L1}$, is set as the objective line pressure $P_{LOR}$ and when the set objective line pressure $P_{LOR}$ is practically supplied, the objective line pressure $P_{LOR}$ is held at the predetermined value for a predetermined time period and then slowly decreased by the slow decompression step amount $\Delta P_L$, as shown in FIGS. 18A and 18B. Finally, the objective line pressure $P_{LOR}$ is converged into a predetermined value such as the reference line pressure $P_{L0}$, although in each minor program it is converged into 0 (MPa) and practically is converted into the reference line pressure $P_{L0}$. In this situation, the friction F between the belt and the pulleys changes according to the line pressure $P_{L(OR)}$, and particularly the friction F is slowly decreased when the line pressure $P_{L(OR)}$ is slowly decompressed. Therefore, the acceleration of the drive system affected by the friction F is slowly decreased so as not to generate vibrations. If the set line pressures $P_{L2}$ to $P_{L4}$ are decompressed quickly, the line pressure PL(OR) is changed as shown by a two-dots and dash line of FIG. 18A while largely deviating the acceleration as shown by a two-dots and dash line of FIG. 18C. With respect to the line pressure $P_L$ to be returned, the increased amount during the decompression of the set line pressures $P_{L2}$ to $P_{L4}$ functions to suppress the slippage of the belt. Therefore, this increased amount does not generate the problem in control except in the setting of the start line pressure $P_{L1}$.

Next, as to the slow decompression step amount $\Delta P_L$ set at the step S305 in the minor program of FIG. 10 executed in the step S3 of FIG. 7, the explanation will be given.

As mentioned above, the fluctuation of the friction between the belt and the pulleys tends to cause the vibrations of the drive system. Such vibrations tend to become large when the transmission ratio $C_P$ is large since the fluctuation of the acceleration becomes large according to the increase of the transmission ratio $C_P$. Therefore, in the control map used in the step S305, the slow decompression step amount $\Delta P_L$ is decreased according to the increase of the transmission ratio $C_P$. This effectively suppresses the vibrations of the drive system under the transmission ratio $C_P$ large condition and rapidly decreases the line pressure $P_{L(OR)}$ so as not to generate the vibrations of the drive system under the transmission ratio $C_P$ small condition, by decreasing the gradient of the line pressure $P_{L(OR)}$ under the slow decompression condition, that is, by decreasing the decompression speed of the line pressure $P_{L(OR)}$. This arrangement decreases the increased amount from the line pressure $P_{L(OR)}$. A time constant for controlling the achievement time with respect to the objective value may be employed in setting the decompression speed. That is, in this case, by setting the time constant $\tau$ so as to become larger according to the increase of the transmission ratio $C_P$, the decompression speed is decreased.

Next, the minor program of FIG. 9 for setting the start line pressure $P_{L1}$ and the affectation thereof will be discussed.

In the processing of FIG. 9, when the previous shift range $S_{RANGE(n-1)}$ is the non-running range and when the present shift range $S_{RANGE(n)}$ is the running range, the routine proceeds from the step S201 through the step S202 to the step S204 wherein the start control flag $F_{STT}$ is set ($F_{STT}$=1). Next, the routine proceeds to the step S205 wherein the start control counter $CNT_1$ is set at the predetermined value $CNT_{STT}$. After the setting of the start control flag $F_{STT}$ ($F_{STT}$=1), the routine proceeds from the step S203 to the step S206 wherein the start control counter $CNT_1$ is decreased by 1. Until the start control counter $CNT_1$ becomes smaller than or equal to 0, the negative determination at the step S208 is repeated. Therefore, the start line pressure $P_{L1}$ is held at the predetermined value $P_{LSTT}$ set at the step S209. When the start control counter $CNT_1$ becomes smaller than or equal to 0, the routine proceeds from the step S208 to the step S207 wherein the start control flag $F_{STT}$ is reset ($F_{STT}$=0). Further, the start line pressure $P_{L1}$ is set at 0 in a breath ($P_{L1} \leftarrow 0$). That is, when the shift range is changed from the N-range to the D-range, the start line pressure $P_{L1}$ is steppingly increased and is held at the predetermined value $P_{LSTT}$ for the predetermined time period $CNT_{STT}$. Thereafter, the start line pressure $P_{L1}$ is quickly decreased and held at 0 (MPa). When the start line pressure $P_{L1}$ is set by the above-mention manner and is greater than the other set line pressure $P_{L2}$ to $P_{L4}$, the start line pressure $P_{L1}$ is treated as the objective line pressure $P_{LOR}$. When the vehicle speed $V_{SP}$ is smaller than or equal to the predetermined start value $V_{SPLO}$, the start line pressure $P_{L1}$ is forcibly treated as the objective line pressure $P_{LOR}$.

When the selected shift range is the non-running range such as N-range, the clutch pressure $P_{CL}$ is 0 (MPa). Under this condition, if the running range such as D-range is selected, the clutch pressure $P_C$ is quickly increased to quickly and smoothly engage the start clutch such as the forward clutch 40 and the reverse brake 50. On the other hand, the clutch pressure $P_{CL}$ is produced from the branch pressure of the line pressure $P_L$, the clutch pressure $P_{CL}$ is quickly increased by setting the line pressure at a some increased value. Therefore, when the starting shift range is selected, the start line pressure $P_{L1}$ is correctly increased at the predetermined value $P_{LSST}$ for the predetermined time period $CNT_{STT}$ so as to increase the line pressure $P_L$. Although the other set line pressures $P_{L2}$ to $P_{L4}$ are required to be produced when the vehicle is put in the running condition, only the start line pressure $P_{L1}$ is required to be produced even when the vehicle is put in the non-running condition. Therefore, when the vehicle speed $V_{SP}$ is smaller than or equal to the predetermined start value $V_{SPLO}$, the start line pressure $P_{L1}$ is set as the objective line pressure $P_{LOR}$ in advance with others.

Thus, the start line pressure $P_{L1}$ is set to quickly increase the clutch pressure $P_{CL}$, and not to correspond to the phenomenon that the input load to the CVT mechanism 29 is temporally increased. This corresponds to the rise-up condition of the clutch pressure $P_{CL}$ shown in FIGS. 19A and 19B. Therefore, as shown by alternate two dots and dash line of FIG. 19B, when the start line pressure $P_{L1}$ is slowly decompressed after the predetermined time period elapsed as is similar to the other set line pressures $P_{L2}$ to $P_{L4}$, the clutch pressure $P_{CL}$ becomes greater than the objective value $P_{CLO}$ due to the increased amount from the line pressure such as the reference line pressure $P_{LO}$, This quick engagement of the forward clutch 40 may produce the vibrations of the drive system. Therefore, the present embodiment according to the present invention is arranged, for example, to quickly decompress the start line pressure $P_{L1}$ to 0 MPa after the predetermined time period $CNT_{STT}$ for adjusting the clutch pressure $P_{CL}$ at the objective value $P_{CLO}$, as shown by a continuous line in FIG. 19A so as to prevent the generation of the vibrations of the start clutch.

When the vehicle just starts running even in that the other set line pressures $P_{L2}$ to $P_{L4}$ and the high reference line pressure are applied, the line pressure $P_{L(OR)}$ should be adjusted to the start line pressure $P_{L1}$ as quickly as possible. Therefore, the present embodiment according to the present invention is arranged such that when the start control flag $F_{STT}$ is set the routine proceeds from the step S301 to the step S303 wherein the slow decompression inhibit flag $F_{INHB}$ is set, and at the step S603 the slow decompression step amount $\Delta P_L$ is set at the predetermined maximum value $\Delta P_{LMAX}$. By this setting of the slow decompression inhibit flag $F_{INHB}$, the routine in the processing of FIG. 11 proceeds promptly from the step S411 to the step S407 after the predetermined time period $CNT_{ACC}$ elapsed. At the step S411, the quick acceleration line pressure $P_{L2}$ is set at 0 (MPa). Similarly, in the routine in the processing of FIG. 12, after the predetermined time period $CNT_{BRKO}$ elapsed the routine proceeds promptly from the step S515 to the step S514 wherein the brake line pressure $P_{L3}$ is set at 0 (MPa). Further similarly, in the processing of FIG. 13, after the accomplishment of the shifting, the routine proceeds promptly from the step S614 to the step S617 wherein the downshift line pressure $P_{L4}$ is set at 0 (MPa). By these implementations, the set line pressures $P_{L2}$ to $P_{L4}$ are correctly increased at the respective predetermined values and are then rapidly decompressed so that the start line pressure $P_{L1}$ is easily achieved. Further, when the slow decompression inhibit flag $F_{INHB}$ and the special upshift control flag $F_{U.S}$ are set, the routine in the processing of FIG. 14 proceeds from the step S614 through the steps S616 and S618 to the step S625 wherein the predetermined downshift value $P_{LD.S}$ is rapidly achieved.

The increased amount of the friction according to the slow decompression of the set line pressures $P_{L2}$ to $P_{L4}$ affects the anti-skid control. That is, the anti-skid control is generally executed by decompressing the wheel cylinder pressure of the wheel put in the locked or locking (tend to lock) condition to decrease the braking force to the wheel and thereby increasing the balance of the road surface reaction torque to increase the wheel speed. However, if the friction is large due to the slow decompression of the set line pressures $P_{L2}$ to $P_{L4}$ as shown by the alternate two-dots and dash line of FIGS. 20A and 20B, the increased amount of the friction functions to prevent the wheel speed $V_{WDi}$ from increasing. This degrades the responsibility of the control. Therefore, the present embodiment according to the present invention is arranged to communicate the transmission control unit 300 and the anti-skid control unit 500 with each other. Further, when the anti-skid control is active, the routine of FIG. 10 proceeds from the step S302 to the step S303 wherein the slow decompression inhibit flag $F_{INHB}$ is set. Therefore, after the setting thereof the set line pressure $P_{L2}$ to $P_{L4}$ are not decompressed slowly and decompressed promptly to the original line pressure $P_L$ as shown by a continuous line of FIG. 20B. Therefore, the wheel speed $V_{WDi}$ is rapidly recovered to the increased speed, and the responsibility of the anti-skid control is ensured.

The line pressure duty valve 120 constitutes the CVT mechanism pressure control valve according to the present invention. The step S12 and the step S209 of FIG. 9, the step S410 of FIG. 11, the steps S511 and S513 of FIG. 12, the steps S625 and the S626 of FIG. 13 executed in the steps S14 to S17 of FIG. 7 constitute a pressure increasing means. The step S305 of FIG. 10, the step S406 of FIG. 11, the step S516 of FIG. 12 and the step S615 of FIG. 13 executed in the steps S13 to S17 of FIG. 7 constitutes a slow decompressing means. The forward clutch 40, the reverse brake 50 and the clutch engagement control duty valve 129 constitute a start clutch engaging means. The step S204 of FIG. 9, the step S301 and S303 of FIG. 10, the step S411 of FIG. 11, the step S515 of FIG. 12 and the step S614 of FIG. 13 constitute a clutch engagement quick decompressing means. The steps S302 and S303 of FIG. 10, the step S411 of FIG. 11, the step S515 of FIG. 12 and the step S614 of FIG. 13 constitute a braking force quick decompressing means.

The contents of Application No. TOKUGANHEI 9-200454, with a filing date Jul. 25, 1997 in Japan, are hereby incorporated by reference.

Although the preferred embodiment according to the present invention has been shown and described to employ a normal selector lever and an inhibitor switch, it will be understood that a selector lever having a manual valve and an inhibitor switch disclosed in a Japanese Patent Provisional Publication No. 2-125174 may be employed instead of the normal lever and switch. This selector lever having the manual valve is arranged to enable the execution of the intended shift command (upshift command, downshift command) under the D-range.

Although the preferred embodiment has been shown and described such that the control unit thereof is constituted by a microcomputer, it will be understood that a combination of electronic circuits such as calculating circuits may be employed in the control unit instead of the microcomputer.

What is claimed is:

1. A control system for a continuously variable transmission (CVT) of a vehicle, the CVT comprising a driver pulley, a follower pulley and a belt intercoupling the pulleys, the CVT varying a transmission ratio by changing effective diameters of the pulleys, the control system comprising:

line pressure applying means for applying a first line pressure to the pulleys;

vehicle condition detecting means for detecting a condition of the vehicle;

increase determining means for determining that the input load from an engine to the CVT is increased, according to the detected vehicle condition;

pressure increasing means for increasing a second line pressure when the input load is increased; and slow decompressing means for slowly decompressing the second increased line pressure.

2. A control system as claimed in claim 1, wherein said slow decompressing means decreases a decompression speed indicative of a speed of the decompression of the increased pressure according to an increase of the transmission ratio of the CVT.

3. A control system as claimed in claim 1, further comprising:

a start clutch engaging means for engaging a start clutch by controlling a branch pressure of the line pressure through a clutch engagement control valve, said pressure increasing means temporally increasing the line pressure when the start clutch is engaged by the start clutch engaging means; and a quick decompressing means for quickly decompressing the line pressure when the line pressure is increased during a start clutch engaged condition and when the line pressure is decompressed.

4. A control system as claimed in claim 1, further comprising:

an anti-skid control means for increasing a wheel speed of a driving wheel by decreasing a braking force generated by a brake cylinder for a drive wheel; and a quick decompressing means for quickly decompressing the line pressure when the anti-skid control means decreases the braking force and when the line pressure increased by said pressure increasing means is decompressed.

5. A control system as claimed in claim 1, wherein said vehicle condition detecting means includes a throttle opening sensor for detecting a quick acceleration of the vehicle, a brake switch for detecting a braking, an inhibitor switch for detecting a start of the vehicle, and an anti-skid control apparatus informing an operation of an anti-skid control.

6. A control system as claimed in claim 5, wherein said increase determining means includes a microcomputer which determines that the input load is increased according to signals from the throttle opening sensor, the brake switch, and the inhibitor switch.

7. A control system as claimed in claim 6, wherein said pressure increasing means includes a microcomputer which outputs a control signal indicative of an increased line pressure to said line pressure applying means according to the determination of said increase determining means.

8. A control system as claimed in claim 1, wherein said slow decompressing means includes a microcomputer which outputs a control signal for slowly decreasing the increased line pressure by a decompression step amount at predetermined intervals to a normal line pressure.

9. A control system as claimed in claim 1, further comprising a pump which applies pressure to the fluid to be supplied to the CVT.

10. A control system for continuously variable transmission (CVT) for a vehicle, the CVT comprising a driver pulley, a follower pulley and a belt intercoupling the pulleys, the CVT varying a transmission ratio by changing effective diameters of the pulleys, the control system comprising:

line pressure controlling means for controlling a line pressure applied to the pulleys;

vehicle condition detecting means for detecting a condition of the vehicle;

increase deciding means for deciding that the input load from an engine to the CVT is increased, according the detected vehicle condition;

decompression speed determining means for determining a decompression speed according to the detected vehicle condition; and decompressing means for decompressing the increased line pressure at the decompression speed.

11. A control system as claimed in claim 10, wherein the vehicle condition includes the transmission ratio of the CVT, the decompression speed being decreased according to the increase of the selected transmission ratio.

12. A control system as claimed in claim 10, wherein said vehicle condition detecting means includes a throttle opening sensor for detecting a quick acceleration of the vehicle, a brake switch for detecting a braking, an inhibitor switch for detecting a start of the vehicle, an input rotation speed sensor for detecting an engagement between the engine and the CVT, and an anti-skid control apparatus informing an operation of an anti-skid control.

13. A control system as claimed in claim 10, wherein when said vehicle condition detecting means detects that the anti-skid control is now being executed the decompression speed takes a large value.

14. A control system as claimed in claim 1, wherein when the increased line pressure is returned to the normal line pressure, the decompression speed takes a small value which is much smaller than the large value.

15. A control system comprising:

- a continuously variable transmission (CVT) for a vehicle, the CVT comprising a driver pulley, a follower pulley and a belt intercoupling the pulleys, the CVT varying a transmission ratio by changing effective diameters of the pulleys;
- a line pressure control valve controlling a line pressure applied to the pulleys according to an input load from an engine to said CVT;
- a vehicle condition detector that detects a condition of the vehicle; and
- a controller receiving a vehicle condition signal from said vehicle condition detector and outputting a control signal to said line pressure control valve, said controller being arranged to determine according to the detected vehicle condition that the input load is increased, to determine a decompression speed according to the detected vehicle condition, and to decompress the increased line pressure at the decompression speed.

16. A continuously variable transmission (CVT) for a vehicle comprising:

- a driver pulley connected to an engine of the vehicle;
- follower pulleys outputting power upon modifying an input power to said driver pulley;
- a belt intercoupling said driver and follower pulleys;
- a line pressure control valve for controlling a first line pressure applied to said follower pulleys;
- a vehicle condition detector that detects a condition of the vehicle; and
- a controller arranged to determine that the input load is increased according to the detected vehicle condition, to increase a second line pressure according to the increase of the input load, and to slowly decompress the increased second line pressure except when one of an anti-skid control and an engagement between the engine and the CVT is executed.

* * * * *